United States Patent
Hori et al.

(10) Patent No.: US 7,340,055 B2
(45) Date of Patent: Mar. 4, 2008

(54) MEMORY CARD AND DATA DISTRIBUTION SYSTEM USING IT

(75) Inventors: Yoshihiro Hori, Gifu (JP); Toshiaki Hioki, Ogaki (JP); Miwa Kanamori, Ogaki (JP); Takatoshi Yoshikawa, Ogaki (JP); Hiroshi Takemura, Aichi (JP); Masataka Takahashi, Ishikawa (JP); Takayuki Hasebe, Kawasaki (JP); Shigeki Furuta, Kawasaki (JP); Takahisa Hatakeyama, Kawasaki (JP); Tadaaki Tonegawa, Kodaira (JP); Takeaki Anazawa, Tokyo (JP)

(73) Assignees: Sanyo Electric Co., Ltd., Osaka (JP); Fujitsu Limited, Kawasaki (JP); Hitachi, Ltd., Tokyo (JP)

( * ) Notice: Subject to any disclaimer, the term of this patent is extended or adjusted under 35 U.S.C. 154(b) by 1261 days.

(21) Appl. No.: 10/130,301

(22) PCT Filed: Dec. 1, 2000

(86) PCT No.: PCT/JP00/08544

§ 371 (c)(1),
(2), (4) Date: May 31, 2002

(87) PCT Pub. No.: WO01/41356

PCT Pub. Date: Jun. 7, 2001

(65) Prior Publication Data

US 2002/0184154 A1 Dec. 5, 2002

(30) Foreign Application Priority Data

Dec. 2, 1999 (JP) ................................. 11/343389

(51) Int. Cl.
*H04N 7/167* (2006.01)
*H04L 9/00* (2006.01)
*H04L 9/32* (2006.01)

(52) U.S. Cl. .................. 380/201; 380/44; 380/277; 713/189; 713/193

(58) Field of Classification Search ........ 380/200–203, 380/277, 44; 713/189, 192–193; 705/57–59
See application file for complete search history.

(56) References Cited

U.S. PATENT DOCUMENTS 5,757,909 A * 5/1998 Park ........................... 380/201
5,799,081 A * 8/1998 Kim et al. .................. 380/203

FOREIGN PATENT DOCUMENTS

EP 0 935 209 A2 8/1999

(Continued)

(Continued)

OTHER PUBLICATIONS

Office Action dated Feb. 7, 2006 issued in Japanese Application No. 2001-542505.

(Continued)

*Primary Examiner*—Hosuk Song
(74) *Attorney, Agent, or Firm*—Westerman, Hattori, Daniels & Adrian, LLP.

(57) ABSTRACT

A memory card (110) conducts an authentication process with a server based on data stored in an authentication data hold unit (1400). The memory card (110) extracts a first session key (Ks1) from a server by a decryption process and a transaction ID from the data applied on a data bus (BS3). The memory card (110) generates a second session key (Ks2) through a session key generation unit (1418), and transmits to the server, as the keys to encrypt content data in receiving decryption of content data, the second session key (Ks2) and a key (KPm(1)) unique to the memory card (110) in an encrypted state with the first session key (Ks1). The transaction ID and the second session key (Ks2) stored in the log memory (1460) are used in the redistribution process.

25 Claims, 24 Drawing Sheets

FOREIGN PATENT DOCUMENTS

| | | |
|---|---|---|
| EP | 0 996 074 A1 | 4/2000 |
| EP | 1 033 894 A2 | 9/2000 |
| JP | 9-74549 | 3/1997 |
| JP | 09-074549 A | 3/1997 |
| JP | 10-283264 A | 10/1998 |
| JP | 11-224288 | 8/1999 |
| JP | 11-328850 | 11/1999 |
| JP | 11-328850 A | 11/1999 |
| JP | 2000-253453 | 9/2000 |
| JP | 2000-268096 | 9/2000 |

OTHER PUBLICATIONS

Partial translation of Nikkei Electronics Mar. 22, 1999 (No. 739).
Partial translation of Wakaru Zukai Text (Diagram Text) Digital type 1-2, Feb. 5, 1995.

* cited by examiner

FIG.2

| LABEL | FUNCTION·FEATURE | STORAGE·GENERATION SITE |
|---|---|---|
| Data | CONTENT DATA, DISTRIBUTED IN THE FORM OF [Data]Kc AS ENCRYPTED CONTENT DATA SUBJECTED TO ENCRYPTION THAT CAN BE DECRYPTED WITH Kc | DISTRIBUTION SERVER |
| Data-inf | ADDITIONAL INFORMATION, INFORMATION IN PLAINTEXT RELATED TO COPYRIGHT OF CONTENT DATA OR SERVER ACCESS | DISTRIBUTION SERVER |
| Kc | CONTENT DECRYPTION KEY | DISTRIBUTION SERVER |
| Kp(n)/Kmc(n) | DECRYPTION KEY DEPENDING ON CONTENT REPRODUCTION/MEDIA CLASS (TYPE OR THE LIKE) | CELLULAR PHONE MEMORY CARD |
| KPp(n)/KPmc(n) | ASYMMETRIC ENCRYPTION KEY THAT CAN BE DECRYPTED USING Kp/Kmc, HAVING AUTHENTICATION FUNCTION, RECORDED IN THE FORM OF {KPp}KPma/{KPp}KPma AT THE TIME OF SHIPMENT | CELLULAR PHONE MEMORY CARD |
| Kcom | SECRET COMMON KEY COMMON TO REPRODUCTION CIRCUIT, USED FOR DECRYPTION OF ENCRYPTED Kc,AC2 (ASYMMETRIC, DISTRIBUTION SERVER KPcom/REPRODUCTION CIRCUIT Kcom ALSO AVAILABLE) | DISTRIBUTION SERVER CELLULAR PHONE |
| KPma | AUTHENTICATION KEY COMMON TO SYSTEM (PUBLIC) | DISTRIBUTION SERVER |
| AC | PURCHASE CONDITION OF LICENSE FROM USER SIDE (FUNCTION RESTRICTION, NUMBER OF LICENSES, ETC) | CELLULAR PHONE |
| AC1 | INFORMATION AS TO RESTRICTION ON MEMORY ACCESS | DISTRIBUTION SERVER |
| AC2 | CONTROL INFORMATION OF REPRODUCTION CIRCUIT | DISTRIBUTION SERVER |
| Km(i) | DECRYPTION KEY UNIQUE TO EACH MEMORY CARD (i IS IDENTIFIER TO IDENTIFY CARD) | MEMORY CARD |
| KPm(i) | ASYMMETRIC PUBLIC ENCRYPTION KEY THAT CAN BE DECRYPTED WITH Km(i) | MEMORY CARD |
| Ks1 | SYMMETRIC KEY UNIQUE TO SESSION, GENERATED FOR EACH DISTRIBUTION SESSION | DISTRIBUTION SERVER |
| Ks2 | SYMMETRIC KEY UNIQUE TO SESSION, GENERATED FOR EACH DISTRIBUTION/TRANSFER (RECEPTION) SESSION | MEMORY CARD |
| Ks3 | SYMMETRIC KEY UNIQUE TO SESSION, GENERATED FOR EACH REPRODUCTION SESSION | MEMORY CARD |
| Ks4 | SYMMETRIC KEY UNIQUE TO SESSION, GENERATED FOR EACH REPRODUCTION SESSION | CELLULAR PHONE |
| CONTENT ID | CODE TO IDENTIFY CONTENT DATA Data | DISTRIBUTION SERVER |
| TRANSACTION ID | CODE TO IDENTIFY LICENSE ISSUE, (MAY INCLUDE CONTENT ID FOR IDENTIFICATION) | DISTRIBUTION SERVER |

MEMORY CARD AND DATA DISTRIBUTION SYSTEM USING IT

TECHNICAL FIELD

The present invention relates to a memory card that allows protection on copyrights with respect to copied information in an information distribution system to distribute information to terminals such as cellular phones, and a distribution system using such a memory card.

BACKGROUND ART

By virtue of the progress in information communication networks and the like such as the Internet in these few years, each user can now easily access network information through individual-oriented terminals employing a cellular phone or the like.

In such information communication, information is transmitted through digital signals. It is now possible to obtain copied music and video information transmitted via the aforementioned information communication network without degradation in the audio quality and picture quality of the copy data, even in the case where the copy operation is performed by an individual user.

Thus, there is a possibility of the copyright of the copyright owner being significantly infringed unless some appropriate measures to protect copyrights are taken when any content data subject to copyright protection such as music and image information is to be transmitted on the information communication network.

However, if copyright protection is given top priority so that distribution of content data through the disseminating digital information communication network is suppressed, the copyright owner who can essentially collect a predetermined copyright royalty for copies of a copyrighted work will also incur some disbenefit.

In the case where content data such as music data is distributed through a digital information communication network as described above, each user will record the distributed data onto some recording apparatus, and then reproduce the data using a reproduction apparatus.

Such recording apparatuses include, for example, a medium that can have data written and erased electrically such as a memory card.

As the apparatus to reproduce distributed music data, the cellular phone per se used to receive such data distribution can be employed, or when the recording apparatus such as a memory card is detachable from the apparatus that receives distribution, a dedicated reproduction apparatus can be used.

In the case where distribution of content data such as music data is to be received through a digital information communication network, particularly through a radio communication network, the communication may be cut off before the music data is completely distributed depending upon the state of the communication line. In the case where encrypted content data which is an encrypted version of content data is decrypted and reproduction information required for reproduction is to be distributed, any disruption in communication during distribution of the encrypted content data can be mended by establishing connection again and continuing data reception. Since the accounting process towards the user is carried out simultaneously in distributing reproduction information, the user will request retransmission of the reproduction information after connection is established again with respect to such disrupted communication. However, reproduction information should not be retransmitted incautiously in response to a request from the standpoint of protecting the rights of copyright owners. However, if retransmission is not conducted, the user will not be able to obtain the reproduction information even though the accounting process has been effected.

DISCLOSURE OF THE INVENTION

An object of the present invention is to provide a data distribution system that can complete distribution of reproduction information even in the case where communication is disrupted before complete distribution of reproduction information by resuming communication upon protecting the rights of copyright owners, and a data recording device such as a memory card used in such a data distribution system.

A data recording device of the present invention to achieve the above object receives and records, through a communication path, reproduction information associated with reproduction of encrypted content data, including a content key to decrypt the encrypted content data into plaintext. The data recording device includes a data communication unit, a first storage unit, an information extraction unit, a second storage unit and a control unit.

The data communication unit establishes an encryption communication path that can transmit encrypted information with the transmission source of the reproduction information to receive the reproduction information supplied to a data recording apparatus individually apart from encrypted content data and transmitted in an encrypted state. The first storage unit stores data associated with the reproduction information applied from the data communication unit. The information extraction unit carries out the process of storing the data associated with the reproduction information from the data communication unit into the first storage unit, and extracting reproduction information based on data stored in the first storage unit. The second storage unit records a reception log indicating the processing status of a reception process to receive and record reproduction information into the first storage unit. The reception log information is generated at the transmission source of the reproduction information every time a reproduction information distribution process is conducted and transmitted to the data recording apparatus, and includes communication identify information to identify a reproduction information distribution process. The control unit controls the operation of the data recording apparatus. The control unit transmits the reception log information recorded in the second storage unit to the data communication unit in response to a request.

Preferably, the data communication unit includes a first key hold unit, a first decryption processing unit, a second key hold unit, a key generation unit, a first encryption processing unit, and a second decryption processing unit. The first key hold unit stores a first private decryption key to decrypt data that is encrypted using a predetermined first public encryption key corresponding to a data recording apparatus. The first decryption processing unit receives and decrypts a first symmetric key that is updated and transmitted from the transmission source of the reproduction information for each communication of the reproduction information, and encrypted using the first public encryption key. The second key hold unit stores a second public encryption key unique to each data recording apparatus. The key generation unit generates a second symmetric key updated for each communication of the reproduction information.

The first encryption processing unit encrypts the second public encryption key and second symmetric key based on the first symmetric key for output. The second decryption processing unit receives reproduction information encrypted with the second public encryption key and further encrypted with a second symmetric key to decrypt the same based on the second symmetric key. The information extraction unit includes a third key hold unit and a third decryption processing unit. The third key hold unit stores a second private decryption key to decrypt data encrypted by the second public encryption key. The third decryption processing unit carries out a decryption process for the second private decryption key in the procedure from the process of storing data associated with reproduction information into the first storage unit to the process of extracting reproduction information. The first storage unit stores the output of the second decryption processing unit or reproduction information based on the output of the second decryption processing unit.

According to another aspect of the present invention, a data distribution system includes a data supply apparatus and a plurality of terminals.

The data supply apparatus supplies individually respective encrypted content data, and reproduction information including a content key which is a decryption key associated with reproduction of encrypted content data and used to decrypt the encrypted content data into plaintext. The data supply apparatus includes a distribution control unit, a distribution information hold unit, a first interface unit, a first session key generation unit, a session key encryption unit, a session key decryption unit, a first license data encryption processing unit, a second license data encryption processing unit, and a distribution log information hold unit. The distribution control unit provides control of the data supply apparatus. The distribution information hold unit stores encrypted content data and reproduction information. The first interface unit transmits/receives data to/from an external source. The first session key generation unit generates a first symmetric key updated for each distribution of reproduction information to a terminal. The session key encryption unit encrypts and provides to the first interface unit a first symmetric key using a first public encryption key predefined corresponding to a user's terminal. The session key decryption unit decrypts the second public encryption key and second symmetric key transmitted in an encrypted state by a first symmetric key. The first license data encryption processing unit encrypts reproduction information to reproduce encrypted content data using a second public encryption key encrypted by a session key decryption unit. The second license data encryption processing unit encrypts the output of the first license data encryption processing unit using a second symmetric key, and applies the encrypted output to the first interface unit for distribution. The distribution log information hold unit records a distribution log indicating the processing status of the current distribution process. The distribution log information is generated at the data supply apparatus every time a reproduction information distribution process is conducted, and includes communication identify information to identify a reproduction information distribution process. The plurality of terminals receive distribution through a communication path from the content data supply apparatus, and correspond to a plurality of users, respectively. Each terminal includes a second interface unit, a reception control unit, and a data storage unit. The second interface unit transmits/receives data to/from an external source. The reception control unit controls the data transfer with an external source. The data storage unit receives and stores encrypted content data and reproduction information. The data storage unit includes a first key hold unit, a first decryption processing unit, a second key hold unit, a key generation unit, a first encryption processing unit, a second decryption processing unit, a first storage unit, a third key hold unit, a third decryption processing unit, and a second storage unit. The first key hold unit stores a first secret encryption key to decrypt data that is encrypted with a predetermined first public encryption key corresponding to the data storage unit. The first decryption processing unit receives a first symmetric key that is updated and distributed for each communication of the reproduction information, and encrypted using the first public encryption key, and applies a decryption process. The second key hold unit stores a second public encryption key differing for each data storage unit. The key generation unit generates a second symmetric key updated for each communication of the reproduction information. The first encryption processing unit encrypts and outputs the second public encryption key and second symmetric key based on the first symmetric key. The second decryption processing unit receives reproduction information encrypted with the second public encryption key and further encrypted with the second symmetric key, and decrypts the reproduction information based on the second symmetric key. The first storage unit stores reproduction information based on the output of the second decryption processing unit. The third key hold unit stores a second private decryption key to decrypt data encrypted with the second public encryption key. The third decryption processing unit applies a decryption process for the second private decryption key in the procedure of the process of storing data associated with reproduction information to the first storage unit to the process of extracting reproduction information. The second storage unit records a reception log indicating the processing status in the distribution process of reproduction information, and including communication identify information. The reception control unit controls the redistribution process based on the reception log when the communication path is cut off during a distribution process. The first storage unit stores an output of the second decryption processing unit or reproduction information based on an output of the second decryption processing unit. The reception control unit transmits the reception log information to the data supply apparatus when the communication path is cut off during a distribution process, and the distribution control unit controls a redistribution process based on the reception log information and the distribution log information when the communication path is cut off during a distribution process.

According to another aspect of the present invention, a data supply apparatus is provided to supply reproduction information to a plurality of terminals corresponding to a plurality of users, respectively, including a data storage unit to record reproduction information associated with reproduction of encrypted content data, including a content key which is a decryption key to decrypt encrypted content data into plaintext, supplied individually apart from encrypted content data, and reception log information indicating a processing status in a distribution process in the distribution process of receiving and recording reproduction information, and including communication identify information. The data supply apparatus includes a distribution information hold unit, a first interface unit, a first session key generation unit, a session key encryption unit, a session key decryption unit, a first license data encryption processing unit, a second license data encryption processing unit, a distribution log information hold unit, and a distribution control unit.

The distribution information hold unit stores content data and reproduction information. The first interface unit transfers data with an external source. The first session key generation unit generates a first symmetric key that is updated for each distribution of reproduction information to a terminal. The session key encryption unit encrypts the first symmetric key using a first public encryption key predefined corresponding to a user's terminal, and provides the encrypted key to the first interface unit. The session key decryption unit decrypts the second public encryption key and second symmetric key transmitted in an encrypted state by the first symmetric key.

The first license data encryption processing unit encrypts reproduction information to reproduce encrypted content data using a second public encryption key decrypted by the session key decryption unit. The second license data decryption processing unit encrypts the output of first license data encryption processing unit using a second symmetric key, and applies the encrypted key to the first interface unit for distribution. The distribution log information hold unit records distribution log information indicating a processing status during a distribution process, and including communication identify information. The distribution control unit controls the operation of the data supply apparatus to generate and transmit to the terminal communication identify information to identify a reproduction information distribution process every time a reproduction information distribution process is conducted. The distribution control unit controls the redistribution process in response to confirmation of a redistribution request from the terminal that was communicating prior to cut off, based on the reception log information recorded in the data storage unit and transmitted from a terminal and distribution log information when the communication path is cut off during a distribution process.

Both the server and memory card store the distribution history and distribution status in a distribution system using the data reproduction apparatus and a memory card employed in the distribution system of the present invention. Therefore, information can be retransmitted by resuming communication even in the case where communication is disrupted during distribution. The reliability of the distribution process can be improved.

BRIEF DESCRIPTION OF THE DRAWINGS

FIG. 2 is a diagram to describe the characteristics of data and information used in communication in the data distribution system of FIG. 1.

BEST MODES FOR CARRYING OUT THE INVENTION

Embodiments of the present invention will be described hereinafter with reference to the drawings.

FIRST EMBODIMENT

Figure 1:
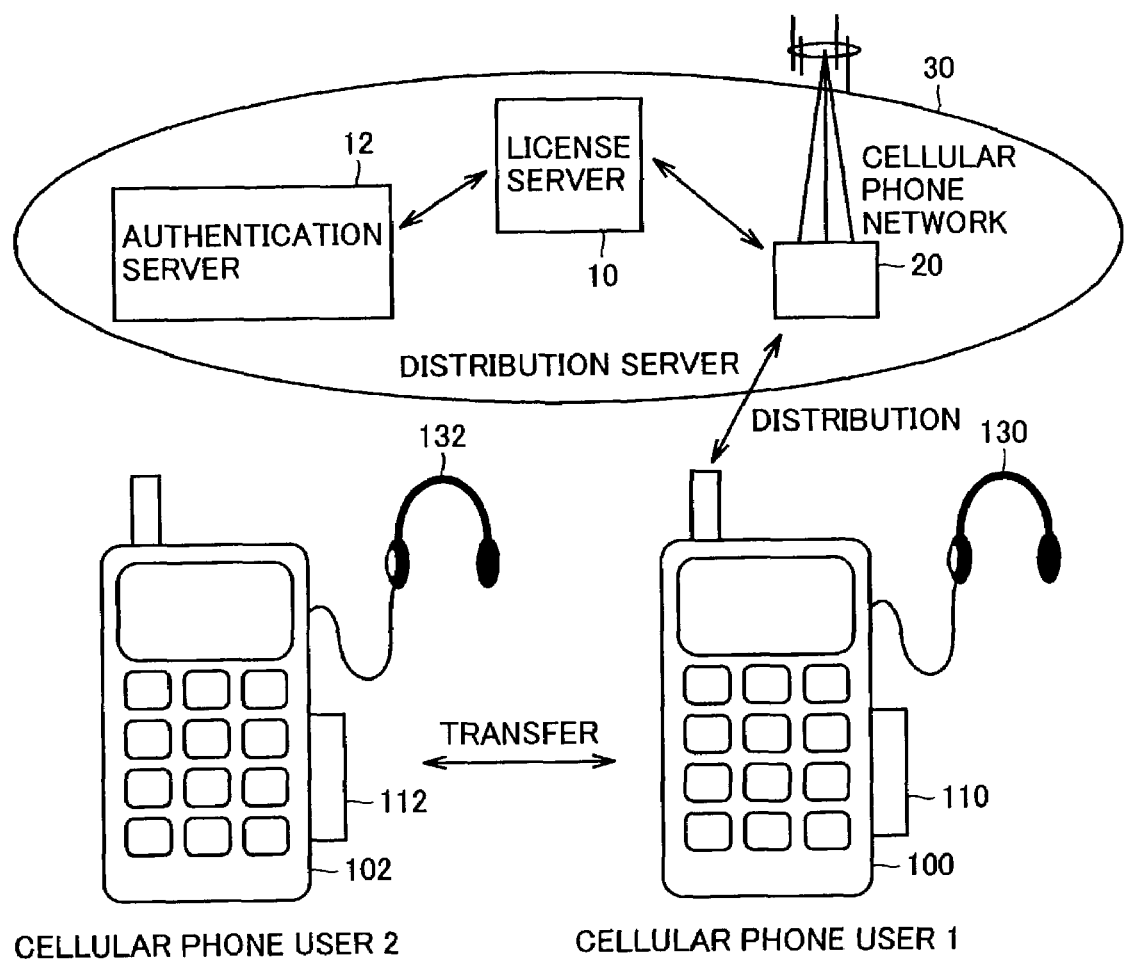
FIG. 1 is a diagram to schematically describe an entire structure of a data distribution system of the present invention.

FIG. 1 is a diagram to describe schematically an entire structure of the data distribution system of the present invention.

In the following, a data distribution system distributing music data to each user via a cellular phone network will be described as an example. However, as will become apparent from the following description, the present invention is not limited to such a case. The present invention is applicable to distribute content data corresponding to other copyrighted works such as book telling data, image data, video data, educational data, and the like, and further applicable to the case of distributing through other digital information communication networks.

Referring to FIG. 1, a license server 10 administrating copyrighted music data encrypts music data (also called "content data" hereinafter) according to a predetermined encryption scheme, and provides such encrypted content data to a cellular phone company which is a distribution carrier 20 to distribute information. An authentication server 12 challenges the authenticity of the user's apparatus establishing access for distribution of content data.

Cellular phone company 20 relays a distribution request from each user to license server 10 through its own cellular phone network. In response to a distribution request, license server 10 verifies the authenticity of the user's apparatus through authentication server 12, and distributes content data to respective user's cellular phone via the cellular phone network of cellular phone company 20 after the requested music data has been further encrypted.

FIG. 1 corresponds to a structure in which a detachable memory card 110 is loaded in a cellular phone 100 of a user 1. Memory card 110 receives the encrypted content data through cellular phone 100 and applies decryption on the above encryption, and then provides the decrypted data to the music reproduction unit (not shown) in cellular phone 100.

User 1, for example, can "reproduce" the music data to listen to the music via a headphone 130 or the like connected to cellular phone 100.

License server 10, authentication server 12, and distribution carrier (cellular phone company) 20 will generically be referred to as a distribution server 30 hereinafter.

The process of transmitting content data to each cellular phone or the like from distribution server 30 is called "distribution".

By such a structure, any user that has not purchased a memory card 110 cannot receive and reproduce distribution data from distribution server 30.

By taking count of the number of times content data of, for example, one song, is distributed in distribution carrier 20, the copyright royalty fee induced every time a user receives (downloads) content data can be collected by distribution carrier 20 in the form of telephone bills of respective cellular phones. Thus, the royalty fee of the copyright owner can be ensured.

Furthermore, since such content data distribution is conducted through a cellular phone network, which is a closed system, there is the advantage that measures to protect copyrights can be taken more easily than compared to an open system such as the Internet.

Here, a user 2 possessing a memory card 112, for example, can directly receive distribution of content data from distribution server 30 through his/her own cellular phone 102. However, direct reception of content data or the like from music server 30 is relatively time consuming for user 2 since the content data includes a large amount of information. In such a case, it will be convenient for the user if content data can be copied from user 1 that has already received distribution of that content data.

However, from the standpoint of protecting the rights of copyright owners, unscrupulous copying of content data is not allowed on the basis of system configuration.

As shown in FIG. 1, the act of letting a user 2 copy the content data received by user 1, and transferring together the reproduction information to render the relevant content data reproducible to user 2 is called "transfer" of music data. In this case, the encrypted content and reproduction information required for reproduction are transferred between memory cards 110 and 112 through cellular phones 100 and 102. As will be described afterwards, "reproduction information" includes a license key that allows decryption of content data encrypted according to a predetermined encryption scheme, and license information such as information of restriction as to access reproduction and a license ID corresponding to information related to copyright protection.

In contrast, the act of copying only content data without transferring reproduction information is called "replicate". Since reproduction information is not transferred in replication, the user receiving this replication can render the data reproducible by requesting distribution of only the reproduction information. Accordingly, distribution of a significant amount of data can be eliminated in the distribution of content data.

By such a structure, the content data distributed by the distribution server can be used flexibly at the reception side.

In the case where cellular phones 100 and 102 are PHSs (Personal Handy Phones), information can be transferred between user 1 and user 2 taking advantage of conversation in the so-called available transceiver mode.

In the structure shown in FIG. 1, the system to render the content data distributed in an encrypted manner reproducible at the user side requires: 1) the scheme to distribute an encryption key in communication, 2) the scheme per se to encrypt distribution data, and 3) a configuration realizing data protection to prevent unauthorized copying of the distributed data.

In the embodiment of the present invention, a distribution system that records and stores the status and history of distribution at both the information transmission side and reception side, and that allows retransmission of information by resuming communication even when communication is disrupted during distribution to improve reliability of the distribution process will be described.

[System Key and Data Configuration]

FIG. 2 is a diagram to describe the characteristics of the keys associated with encryption used in communication and data to be distributed in the data distribution system of FIG. 1.

The data "Data" distributed by distribution server 30 is content data such as music data. The content data is distributed to a user from distribution server 30 in the form of encrypted content data {Data}Kc subject to encryption that can be decrypted using at least a license key Kc.

In the following, the expression of {Y}X implies information having data Y converted into encryption that can be decrypted using a key X.

From the distribution server are distributed additional information Data-inf in plaintext such as the information related to content data or related to server access and the like, together with the content data. Specifically, additional information Data-inf includes information to identify the content data such as the song title or the name of the artist and to identify distribution server 30.

Keys related to the encryption, decryption and reproduction process of content data as well as to authentication of a cellular phone which is the content reproduction circuit and a memory card which is a recording apparatus are set forth below.

As mentioned before, there are provided a license key Kc used to decrypt encrypted content data, a public encryption key KPp(n) unique to the content reproduction circuit (cellular phone 100), and a public encryption key KPmc(m) unique to a memory card.

Data encrypted using public encryption keys KPp(n) and KPmc(m) can be decrypted respectively using a secret encryption key Kp(n) unique to the content reproduction circuit (cellular phone 100) and a private decryption key Kmc(m) unique to the memory card. These unique private decryption keys having different contents for each type of cellular phone and each type of memory card. Here the type of cellular phone and memory card is defined based on the manufacturer thereof, the fabrication time (fabrication lot) and the like. The unit assigned to the public secret key and private decryption key is referred to as "class." Natural numbers m,n represent the numbers to discriminate the class of each memory card and content reproduction circuit (cellular phone).

Keys operated common to the entire distribution system include a secret common key Kcom used in obtaining license key Kc and restriction information for the reproduction circuit that will be described afterwards, and an authentication key KPma. Secret common key Kcom is stored at both the distribution sever and the cellular phone.

Public encryption keys KPmc(m) and KPp(n) specified for each memory card and content reproduction circuit can have their authenticity verified by decrypting with authentication key KPma. More specifically, they are recorded in respective memory cards and cellular phones at the time of shipment in the form of authentication data {KPmc(m)}KPma and {KPp(n)}KPma subject to the authentication process.

Secret common key Kcom is not restricted to be in the symmetric key cryptosystem. It can be replaced with the private decryption key or public encryption key KPcom in the public key cryptosystem. In this case, private key Kcom and public key KPcom are held in cellular phone 100 and distribution server 30, respectively, as secret common key.

Information to control the operation of the apparatus constituting the system, i.e. cellular phone 100 which is a content reproduction circuit and memory card 110, includes purchase condition information AC transmitted from cellular phone 100 to distribution server 30 when a user purchases a license key or the like for the purpose of specifying the purchase condition, access restriction information AC1 distributed from distribution server 30 towards memory card 110 according to purchase condition information AC, indicating the number of times of accessing license key Kc for reproduction (reproduction permitted times), the number of replicates and transfer of license key Kc, and restriction as to copy and transfer, and reproduction circuit restriction information AC2 distributed from distribution server 30 to memory card 110, indicating restriction as to the reproduction condition of the content reproduction circuit, loaded in cellular phone 100. The reproduction condition of the reproduction circuit implies the condition, for example, of allowing reproduction of only the beginning of each content data for a predetermined time such as in the case where a sample is distributed at low price or freely to promote a new song, the reproduction period and the like.

The keys to administer data processing in memory card 100 includes a public encryption key KPm(i) (i: natural number) specified for each memory card, and a private decryption key Km(i) unique to each memory card that can decrypt data encrypted with public encryption key KPm(i). Here, natural number i represents a number to discriminate each memory card.

In the data distribution system of FIG. 1, keys used in data communication are set forth below.

The key to ensure security during data transfer with an external source to the memory card or between memory cards includes symmetric keys Ks1-Ks4 generated at server 30, cellular phone 100 or 102, and memory card 110 or 112 every time content data distribution, reproduction or transfer is carried out.

Here, symmetric keys Ks1-Ks4 are unique symmetric keys generated for each "session" which is the access unit or communication unit among the server, content reproduction circuit or memory card,. In the following, these symmetric keys Ks1-Ks4 are also called "session keys".

These session keys Ks1-Ks4 have a unique value for each communication session, and is under control of the distribution server, content reproduction circuit and memory card.

More specifically, a session key Ks1 is generated for each distribution session by distribution server 30. A session key Ks2 is generated for each distribution session and transfer (reception side) session of a memory card. Session key Ks3 is generated for each reproduction session and transfer (transmission side) session in a memory card. A session key Ks4 is generated for each reproduction session of the cellular phone. The level of security can be improved in each session by transferring the session keys and receiving a session key generated by another apparatus to perform encryption using the session keys and transmitting the license decryption key.

Data transferred with a distribution server includes a content ID for the system to identify each content data, and a transaction ID which is a code generated for each distribution session to identify each distribution session. It is to be noted that the license ID and transaction ID can be shared.

The license ID, content ID and access restriction information AC1 are generically referred to as license information. This license information, license key Kc and reproduction circuit restriction information AC2 are generically referred to as reproduction information.

[Configuration of License Server 10]

Figure 4:
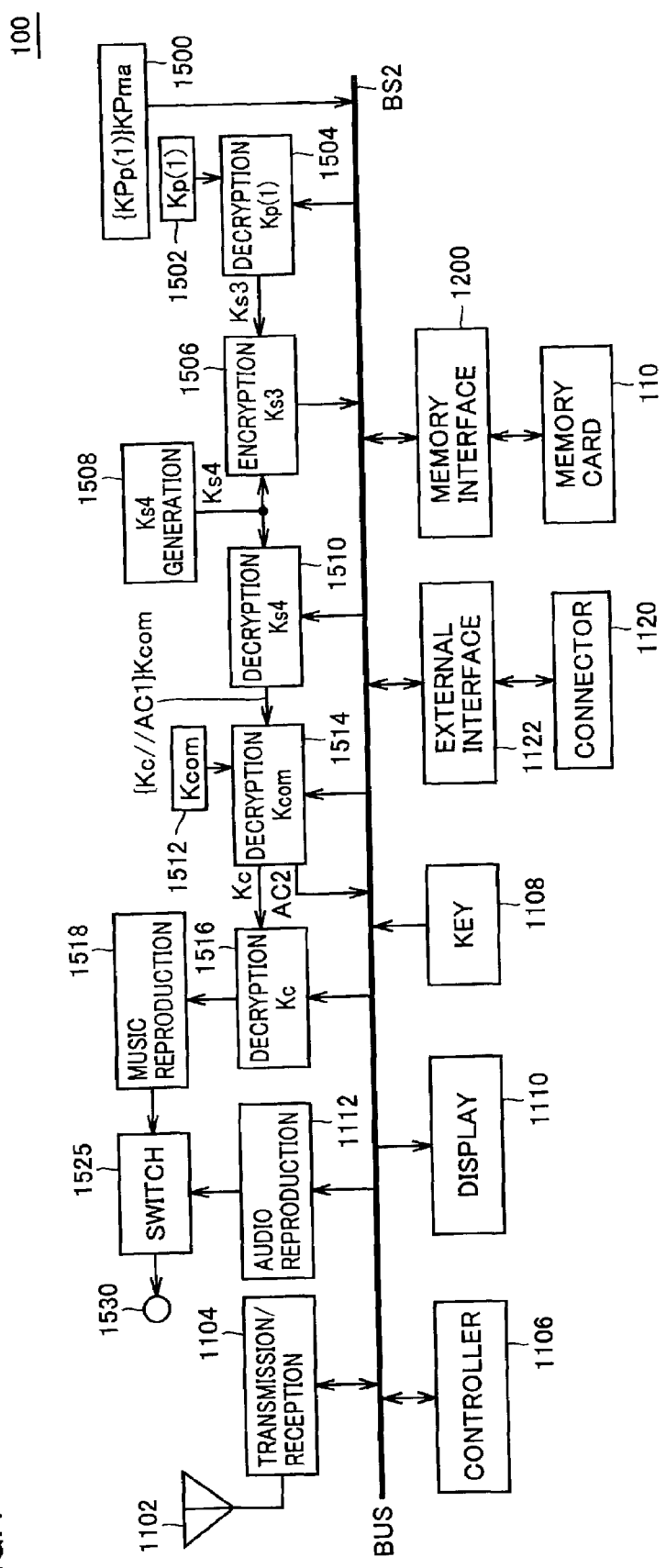
FIG. 4 is a schematic block diagram showing a structure of a cellular phone 100.

FIG. 4 is a schematic block diagram showing a structure of license server 10 of FIG. 1.

License server 10 includes an information database 304 to store content data encrypted according to a predetermined scheme as well as distribution information such as a license ID, an account database 302 to store accounting data according to the start of access to content data for each user, a log administration database 306 to store log information of the license server, a data processing unit 310 receiving data through a data bus BS1 from information database 304, accounting database 302 and log administration database 306 to apply a predetermined process, and a communication device 350 to transfer data between distribution carrier 20 and data processing unit 310 via the communication network.

"License distribution log" indicating the distribution history of the license information stored in log administration database 306 includes the transaction ID, content ID, public encryption key KPmc(n), KPp(n), access restriction information AC1, reproduction circuit restriction information AC2, public encryption key KPm(i), session key Ks2, and an accounting status flag. The accounting status flag indicates whether the accounting process for the currently-distributed content data has already ended or not.

Data processing unit 310 includes a distribution control unit 315 to control the operation of data processing unit 310 according to the data on data bus BS1, a session key generation unit 316 to generate a session key Ks1 in a distribution session, under control of distribution control unit 315, a decryption processing unit 312 receiving through communication device 350 and data bus BS1 authentication data {KPmc(n)}KPma and {KPp(n)}KPma sent from a memory card and a cellular phone to apply a decryption process on authentication key KPma, an encryption processing unit 318 encrypting session key Ks1 generated by session key generation unit 316 using public encryption key KPmc(m) obtained by decryption processing unit 312 to provide the encrypted key onto data bus BS1, and a decryption processing unit 320 receiving through data bus BS1 the data encrypted with session key Ks1 and transmitted by each user.

Data processing unit 310 further includes a Kcom hold unit 322 storing secret common key Kcom, an encryption processing unit 324 encrypting license key Kc and reproduction circuit restriction information AC2 applied from distribution control unit 315 using secret common key Kcom, an encryption processing unit 326 to encrypt the data output from encryption processing unit 324 using a public encryption key KPm(i) unique to the memory card obtained from decryption processing unit 320, and an encryption processing unit 328 further encrypting the output of encryption processing unit 326 using a session key Ks2 applied from decryption processing unit 320 to provide the encrypted key onto data bus BS1.

In the case where secret common key Kcom is the key of an asymmetric public key cryptosystem, Kcom hold unit 322 stores public key Kpcom, which is the encryption key in the public key cryptosystem, instead of secret common key Kcom in the symmetric key cryptosystem.

[Configuration of Cellular Phone 100]

FIG. 4 is a schematic block diagram to describe a structure of a cellular phone 100 of FIG. 1.

In cellular phone 100, the natural number n representing the class is set to n=1.

Cellular phone 100 includes an antenna 1102 to receive a signal transmitted through radio by a cellular phone network, a transmitter/receiver unit 1104 converting the signal received from antenna 1102 into a base band signal, or modulating and providing to antenna 1102 the data from a cellular phone, a data bus BS2 to transfer data between respective components of cellular phone 100, and a controller 1106 to control the operation of cellular phone 100 via data bus BS2.

Cellular phone 100 further includes a key board 1108 to apply designation to cellular phone 100 from an external source, a display 1110 to apply the information output from controller 1106 or the like to the user as visual information, an audio reproduction unit 1112 reproducing audio based on reception data provided via data bus BS2 in a general conversation operation, a connector 1120 to transfer data with an external source, and an external interface unit 1122 providing the data from connector 1120 to data bus BS2 for conversion, or to convert the data from data bus BS2 into a signal that can be applied to connector 1120.

Cellular phone further includes a detachable memory card 110 storing content data (music data) for a decryption process, a memory interface 1200 to control data transfer between memory card 110 and data bus BS2, and an authentication data hold unit 1500 storing a public encryption key KPp(1) set for each cellular phone class in an encrypted state that can be authenticated by decryption using authentication key KPma.

Cellular phone 100 further includes a Kp hold unit 1502 storing private decryption key Kp(n) (n=1) which is a encryption key unique to the cellular phone (content reproduction circuit) class, a decryption processing unit 1504 decrypting the data received from data bus BS2 using private decryption key Kp(1), and obtaining session key Ks3 generated by the memory card, a session key generation unit 1508 generating using a random number a session key Ks4 used to encrypt data transferred on data bus BS2 with memory card 110 in a session of reproducing content data stored in memory card 110, an encryption processing unit 1506 encrypting generated session key Ks4 using a session key Ks3 obtained by decryption processing unit 1504, and a decryption processing unit 1510 decrypting the data on data bus BS2 using session key Ks4 to output data {Kc//AC2}Kcom.

Cellular phone 100 further includes a Kcom hold unit 1512 storing a secret common key Kcom, a decryption processing unit 1514 decrypting data {Kc//AC2}Kcom output from decryption processing unit 1510 using secret common key Kcom to output license key Kc and reproduction circuit restriction information AC2, a decryption processing unit 1516 receiving encrypted content data {Data}Kc from data bus BS2 to decrypt the data using license key Kc obtained by decryption processing unit 1510 to output content data Data, a music reproduction unit 1518 to receive content data Data which is the output of decryption processing unit 1516 to reproduce content data, a switch unit 1525 receiving the outputs of music reproduction unit 1518 and audio reproduction unit 1112 to selectively provide an output according to the operation mode, and a connection terminal 1530 receiving the output of mixer unit 1525 for connection to headphone 130.

Here, reproduction circuit restriction information AC2 output from decryption processing unit 1514 is applied to controller 1106 via data bus BS2.

In FIG. 4, only the blocks associated with distribution and reproduction of music data among the blocks forming the cellular phone are illustrated for the sake of simplification. Blocks related to the general conversation function inherent to a cellular phone are left out.

[Configuration of Memory Card 110]

Figure 5:
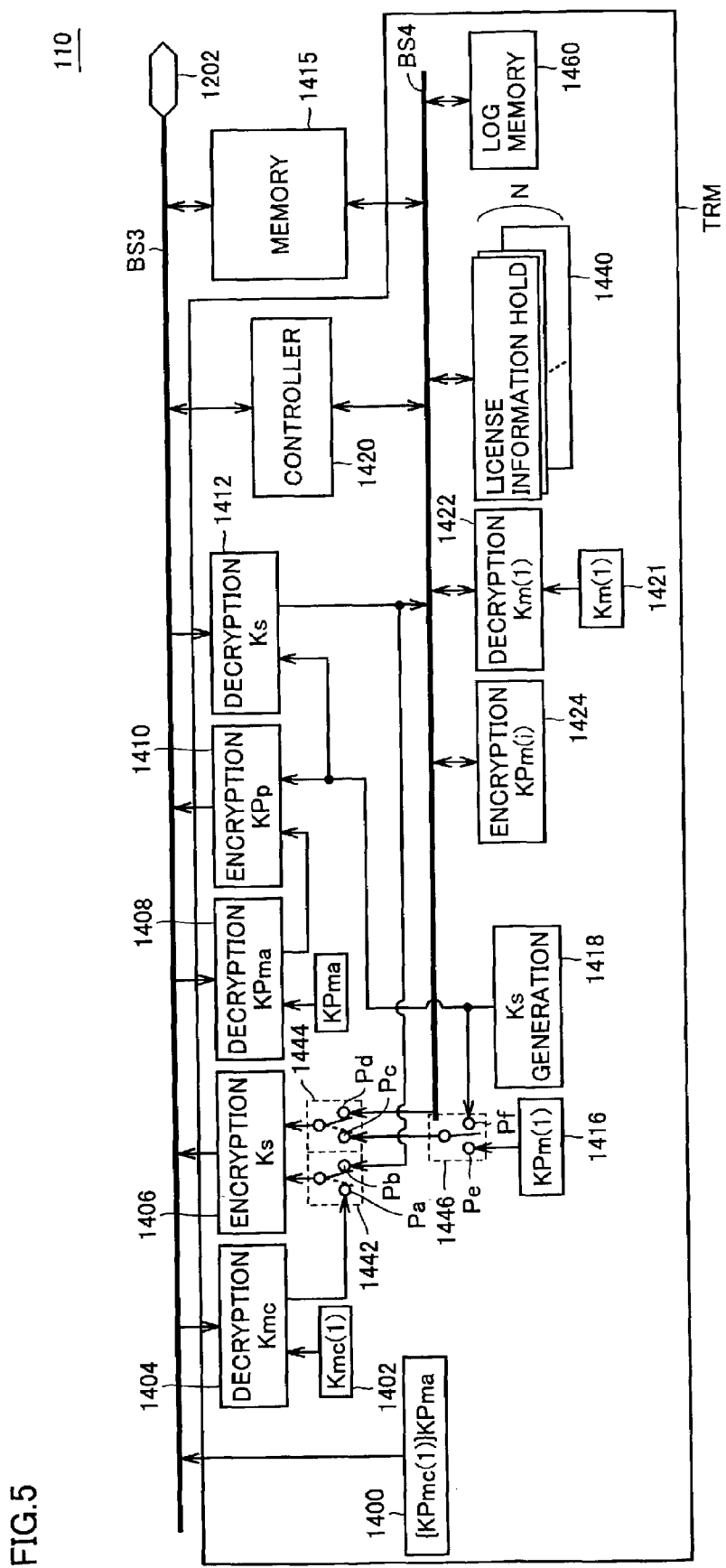
FIG. 5 is a schematic block diagram showing a structure of a memory card 110.

FIG. 5 is a schematic block diagram to describe a structure of memory card 110 of FIG. 1.

As described before, public encryption key KPm(i) and a corresponding private decryption key Km(i) take unique values for each memory card. In memory card 110, it is assumed that the natural number is set to i=1. Also, KPmc(m) and Kmc(m) are set as the public encryption key and secret encryption key unique to the class of the memory card. In memory card 110, it is assumed that the natural number m is represented as m=1.

Memory card 110 includes an authentication data hold unit 1400 to store authentication data {KPmc(1)}KPma, a Kmc hold unit 1402 storing a unique decryption key Kmc(1) set for each memory card class, a KPm(1) hold unit 1416 to store a unique public encryption key KPm(1) set for each memory card, and a Km(1) hold unit 1421 storing an asymmetric private decryption key Km(1) that can be decrypted using public encryption key KPm(1). Here, authentication data hold unit 1400 encrypts and stores public encryption key KPmc(1) set for each memory card class using authentication key KPma in an authenticatable state. Authentication data hold unit 1400 encrypts and stores public encryption key KPmc(1) set for each memory card class in a state that can have the authenticity verified by decryption using authentication key KPma.

Memory card 110 further includes a data bus BS3 to transfer a signal with memory interface 1200 via a terminal 1202, a decryption processing unit 1404 receiving the data applied from memory interface 1200 onto data bus BS3, and receiving a private decryption key Kmc(1) unique to each memory card class from Kmc(1) hold unit 1402, and providing session key Ks3 generated by the distribution server in a distribution session to contact Pa, a decryption processing unit 1408 receiving authentication key KPma from KPma hold unit 1443 to execute a decryption process using authentication key KPma from the data applied on data bus BS3 and providing the decrypted result to encryption processing unit 1410, and an encryption processing unit 1406 encrypting data selectively applied from switch 1444 using a key selectively applied by switch 1442, and providing the encrypted data onto data bus BS3.

Memory card 110 further includes a session key generation unit 1418 generating a session key at each distribution, reproduction and transfer session, an encryption processing unit 1410 encrypting the session key output from session key generation unit 1418 using public encryption key KPp(n) obtained by encryption processing unit 1408 to output the encrypted key onto data bus BS3, and a decryption processing unit 1412 receiving encrypted data on data bus BS3 to apply a decryption process using session key Ks3 obtained by session key generation unit 1418, and providing the decrypted result to data bus BS4.

Memory card 110 further includes an encryption processing unit 1424 encrypting the data on data bus BS4 using a public encryption key KPm(i) (i is 1 or number j of another memory card) unique to the memory card, a decryption processing unit 1422 to decrypt the data on data bus BS4 using a secret encryption key Km(1) unique to memory card 110 that is the companion to public encryption key KPm(1), and a memory 1415 receiving and storing from data bus BS4 a portion of the reproduction information encrypted with public encryption key KPm(1) (content decryption key Kc, content ID, license ID access control information AC1, reproduction circuit control information AC2), as well as receiving and storing encrypted content data {Data}Kc.

Memory card 110 further includes a license information hold unit 1440 storing license information obtained by decryption processing unit 1422 (transaction ID, content ID and access restriction information AC1), a log memory 1460 to store the log of the transmission/reception of the reproduction information in the memory card, and a controller 1420 transferring data with an external source via data bus BS3 to receive reproduction information and the like with data bus BS4 to control the operation of memory card 110.

"Reception log" indicating the reception status of the reproduction information stored in log memory 1460 includes the transaction ID, session key Ks2, and the like. In the first embodiment, the reception log information corresponds to data generated in the event of license reception, and is erased when reception and storage of the reproduction information to memory card 110 are completed.

It is assumed that the region TRM enclosed by the solid line in FIG. 5 is incorporated in a module TRM to disable readout of data and the like in the circuit located in that region by a third party by erasing the internal data or destroying the internal circuitry when an improper open process is conducted from an external source. Such a module is generally a tamper resistant module.

A structure may be implemented in which memory 1415 is also incorporated in module TRM. However, since the data stored in memory 1415 is completely encrypted according to the structure shown in FIG. 6, a third party will not be able to reproduce the music with just the data in memory 1415. Furthermore, it is not necessary to provide memory 1415 in the expensive tamper resistance module. Thus, there is the advantage that the fabrication cost is reduced.

[Distribution Operation]

The operation in each session of the data distribution system according to an embodiment of the present invention will be described in detail hereinafter with reference to the flow charts.

Figure 6:
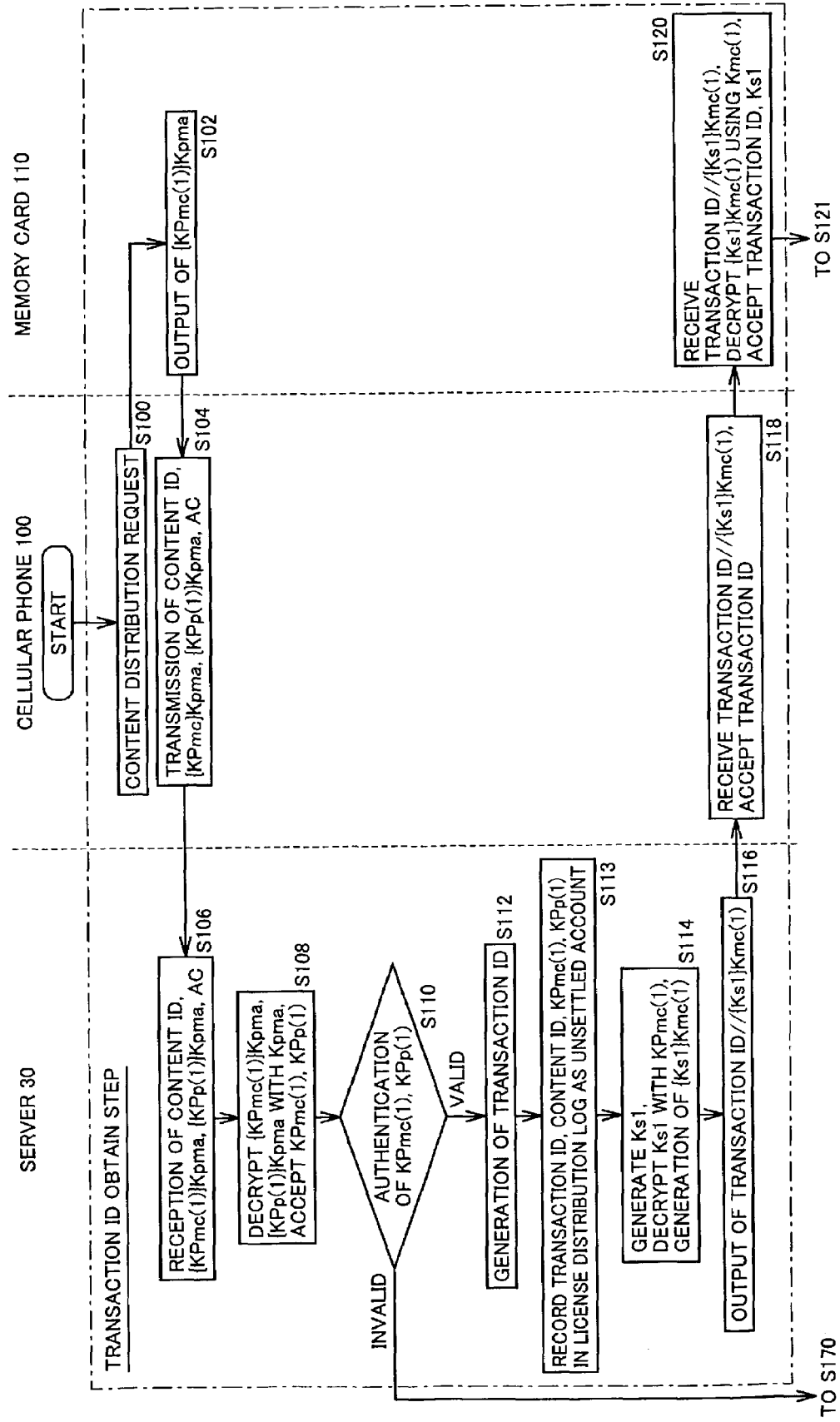
FIG. 6 is a first flow chart to describe a distribution operation in the data distribution system of a first embodiment.
Figure 7:
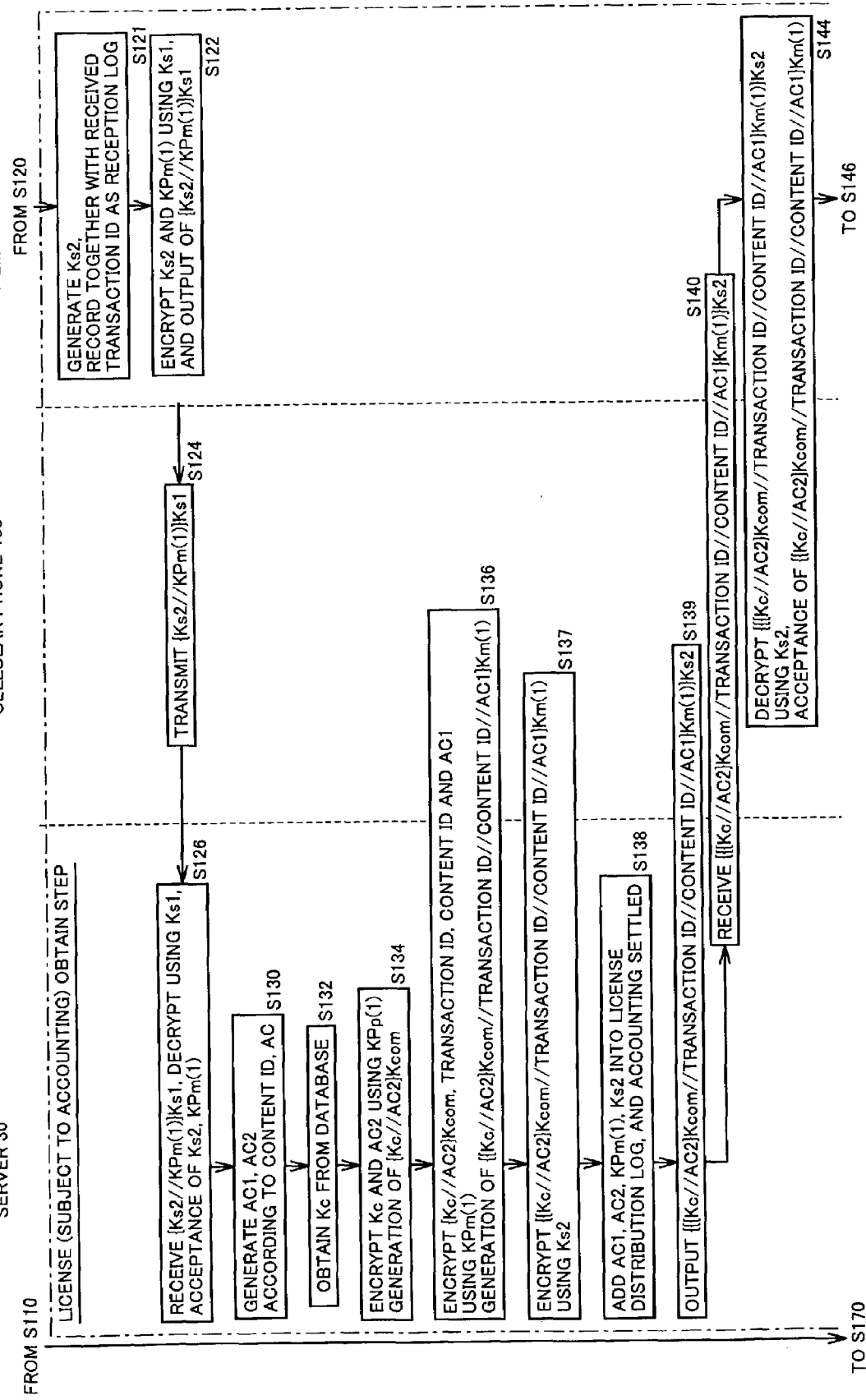
FIG. 7 is a second flow chart to describe a distribution operation in the data distribution system of the first embodiment.
Figure 8:
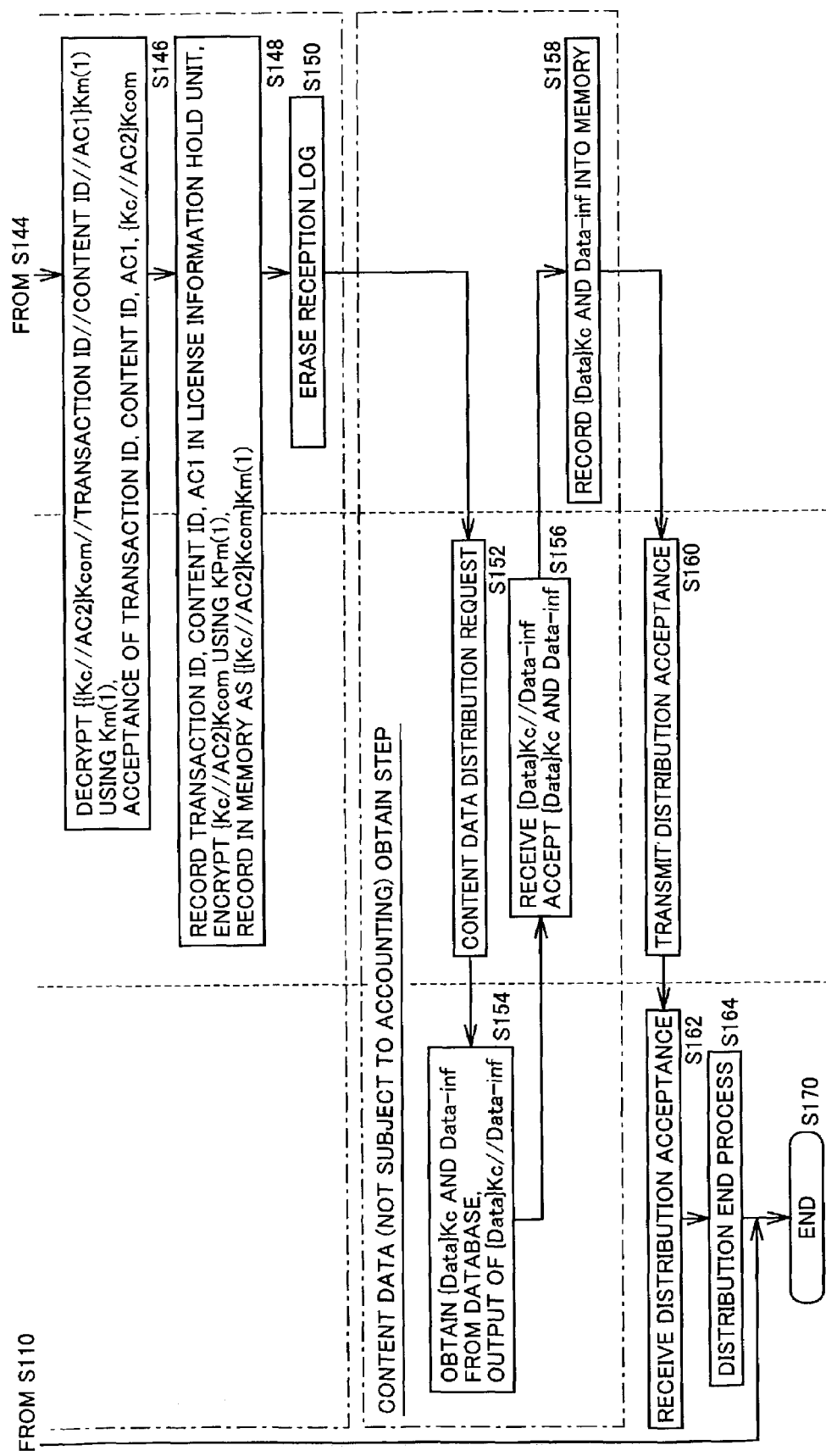
FIG. 8 is a third flow chart to describe a distribution operation in the data distribution system of the first embodiment.

FIGS. 6, 7 and 8 are the first, second and third flow charts, respectively, to describe a distribution operation in the event of purchasing content according to the data distribution system of the first embodiment (also called "distribution session" hereinafter).

FIGS. 6-8 correspond to the operation of user 1 receiving content data distribution from distribution server 30 via cellular phone 100 using memory card 110.

First, a distribution request is issued from cellular phone 100 of user 1 through the operation of the key buttons on touch key unit 1108 by user 1 (step S100).

At memory card 110, authentication data {KPmc(1)}KPma is output from authentication data hold unit 1400 in response to the distribution request (step S102).

Cellular phone 100 transmits to distribution server 30 authentication data {KPp(1)}KPma for authentication of cellular phone 100 per se, the content ID and license purchase condition AC in addition to authentication data {KPmc(1)}KPma accepted from memory card 110 for authentication (step S104).

Distribution server 30 receives the content ID, authentication data {KPmc(1)}KPma, {KPp(1)}KPma, license purchase condition data AC from cellular phone 100 (step S106). Decryption processing unit 312 executes a decryption process using authentication key KPma. Accordingly, distribution server 30 accepts public encryption key KPmc(1) of memory card 110 and KPp(1) which is the public encryption key of cellular phone 100 (step S108).

Distribution control unit 315 conducts authentication by authentication server 12 based on the accepted secret encryption keys KPmc(1) and KPp(1) (step S110). When these public encryption keys are valid, control proceeds to the next process (step S112). When these public secret keys are invalid, the process ends (step S170).

In verifying the authenticity of public encryption key KPp(1) or KPmc(1) in the decryption process by authentication key KPma, authentication server 12 performs the authentication. Since public encryption key KPp(1) or KPmc(1) is encrypted so that its authenticity can be determined by decrypting using authentication key KPma, a structure may be implemented in which distribution control unit 315 of license server 10 performs authentication from the decryption result using authentication key KPma.

When verification is made that the distribution is towards a proper memory card as a result of authentication, distribution control unit 315 generates a transaction ID to identify the distribution session (step S112).

When verification is made that the distribution is towards a proper memory card as a result of authentication, distribution control unit 315 also records the transaction ID, content ID, public encryption keys KPmc(1) and KPp(1) in administration database 306 together with the information indicating unsettled accounting (accounting status flag) as the license distribution log (step S113).

At distribution server 30, session key generation unit 316 generates a session key Ks1 for distribution. Session key Ks1 is encrypted by encryption processing unit 318 using a public encryption key KPmc(1) corresponding to memory card 110 obtained from decryption processing unit 312.

The transaction ID and encrypted session key {Ks1}Kmc(1) are output via data bus BS1 and communication device 350 (step S116).

Upon reception of the transaction ID and encrypted session key {Ks1}Kmc(1) at cellular phone 100, (step S118), the received data is applied onto data bus BS3 via memory interface 1200 in memory card 110. Decryption processing unit 1404 decrypts {Ks1}Kmc(1) using a private decryption key Kmc(1) unique to memory card 110 stored in hold unit 1402, whereby session key Ks1 is decrypted and extracted. As a result, the transaction ID and session key Ks1 are accepted (step S120).

The procedure up to step S120 is referred to as the "transaction ID obtain step".

Referring to FIG. 7, upon confirmation of the acceptance of session key Ks1 generated at distribution server 30, controller 1420 designates session key generation unit 1418 to generate a session key Ks2 generated in the distribution operation of the memory card. Controller 1420 also records in log memory 1460 session key Ks2 together with the received transaction ID (step S121).

Encryption processing unit 1406 encrypts session key Ks2 applied by sequential switching of the contact of switches 1444 and 1446 as well as public encryption key KPmc(1) using session key Ks1 applied from decryption processing unit 1406 via contact Pa of switch 1442, whereby {Ks2//KPm(1)}Ks1 is output onto data bus BS3 (step S122).

Encrypted data {Ks2//KPm(1)}Ks1 output onto data bus BS3 is transmitted from data bus BS3 to cellular phone 100 via terminal 1202 and memory interface 1200, and then transmitted from cellular phone 100 to distribution server 30 (step S124).

Distribution server 30 receives encrypted data {Ks2//KPm(1)}Ks1 to execute a decryption process using session key Ks1 by decryption processing unit 320. Session key Ks2 generated at the memory card and public encryption key KPm(1) unique to memory card 110 are accepted (step S126).

Distribution control unit 315 generates access restriction information AC1 and reproduction circuit restriction information AC2 according to the content ID and license purchase condition data AC obtained at step S106 (step S130). Also, license key Kc to decrypt the encrypted content data is obtained from information database 304 (step S132).

Distribution control unit 315 applies the obtained license key Kc and reproduction circuit restriction information AC2 to encryption processing unit 324. Encryption processing unit 324 encrypts license key Kc and reproduction circuit restriction information AC2 using secret common key Kcom obtained from Kcom hold unit 322 (step S134).

Encrypted data {Kc//AC2}Kcom output from encryption processing unit 324, and the transaction ID, content ID and access restriction information AC1 output from distribution control unit 315 are encrypted by encryption processing unit 326 using a public encryption key KPm(1) unique to memory card 110 obtained by decryption processing unit 320 (step S136).

Encryption processing unit 328 receives the output of encryption processing unit 326 and applies encryption using session key Ks2 generated by memory card 110 (step S137).

Distribution control unit 315 records access restriction information AC1, reproduction circuit restriction information AC2, public encryption key KPm(1), session key Ks2 in log data administration database 306 together with the information of settled accounting (accounting status flag) (step S138).

Encrypted data {{{Kc//AC2}Kcom//transaction ID//content ID//AC1}Km(1)}Ks2 output from encryption processing unit 328 is transmitted to cellular phone 100 via data bus BS1 and communication device 350 (step S139).

By transferring respective session keys generated at the transmission server and memory card to each other to execute encryption using respective received encryption keys and transmitting the encrypted data to the other party, authentication of each other can be virtually conducted in the transmission/reception of respective encrypted data. Thus, security of the data distribution system can be improved. Furthermore, distribution server 30 will record and store the accounting status and information associated with the distribution history.

Cellular phone 100 receives the transmitted encrypted data {{{Kc//AC2}Kcom//transaction ID//content ID//AC1}Km(1)}Ks2 (step S140). At memory card 110, the received data applied onto data bus BS3 via memory interface 1200 is decrypted by decryption processing unit 1412. Specifically, decryption processing unit 1412 decrypts the reception data on data bus BS3 using session key Ks2 applied from session key generation unit 1418 and provides the decrypted data onto data bus BS4 (step S144).

Referring to FIG. 8, data {{Kc//AC2}Kcom//license ID//content ID//AC1}Km(1) decryptable with private decryption key Km(1) stored in Km(1) store unit 1421 is output onto data bus BS4 at the stage of step S144. This data {{Kc//AC2}Kcom//transaction ID//content ID//AC1}Km(1) is first decrypted by a private decryption key Km(1), whereby data {Kc//AC2}Kcom, the transaction ID, content ID, and access control information AC1 which are the reproduction information are accepted (step S146).

The transaction ID, content ID and access restriction information AC1 are recorded in license information hold unit 1440. Data {Kc//AC2}Kcom is encrypted again with public encryption key KPm(1) and stored in memory 1415 as data {{Kc//AC2}Kcom}Km(1) (step S148).

The reception log in log memory 1460 is erased (step S150).

The process from step S121 to step S150 is referred to as the "reproduction information obtain step". In this "reproduction information obtain step", the accounting subject process is carried out.

At the stage of proper completion of the process up to step S150, a content data distribution request is issued from cellular phone 100 to distribution server 30 (step S152).

In response to reception of a content data distribution request, distribution server 30 obtains encrypted content data {Data}Kc and additional information Data-inf from information database 304 and outputs the same via data bus BS1 and communication device 350 (step S154).

Cellular phone 100 receives {Data}Kc//Data-inf, and accepts encrypted content data {Data}Kc and additional information Data-inf (step S156). Encrypted content data {Data}Kc and additional information Data-inf are transmitted onto data bus BS3 of memory card 110 via memory interface 1200 and terminal 1202. At memory card 110, the received encrypted content data {Data}Kc and additional information Data-inf are directly stored in memory 1415 (step S158).

The process from step S152 to step S158 is referred to as the "content data obtain step". In this "content data obtain step", a process not subject to accounting is carried out.

A distribution acceptance notification is transmitted from memory card 110 to distribution server 30 (step S160). Upon reception of the distribution acceptance at distribution server 30 (step S162), the distribution end process is executed accompanying storage of the accounting data into account database 302 (step S164). Thus, the distribution server process ends (step S170).

[Reconnection Operation]

Figure 9:
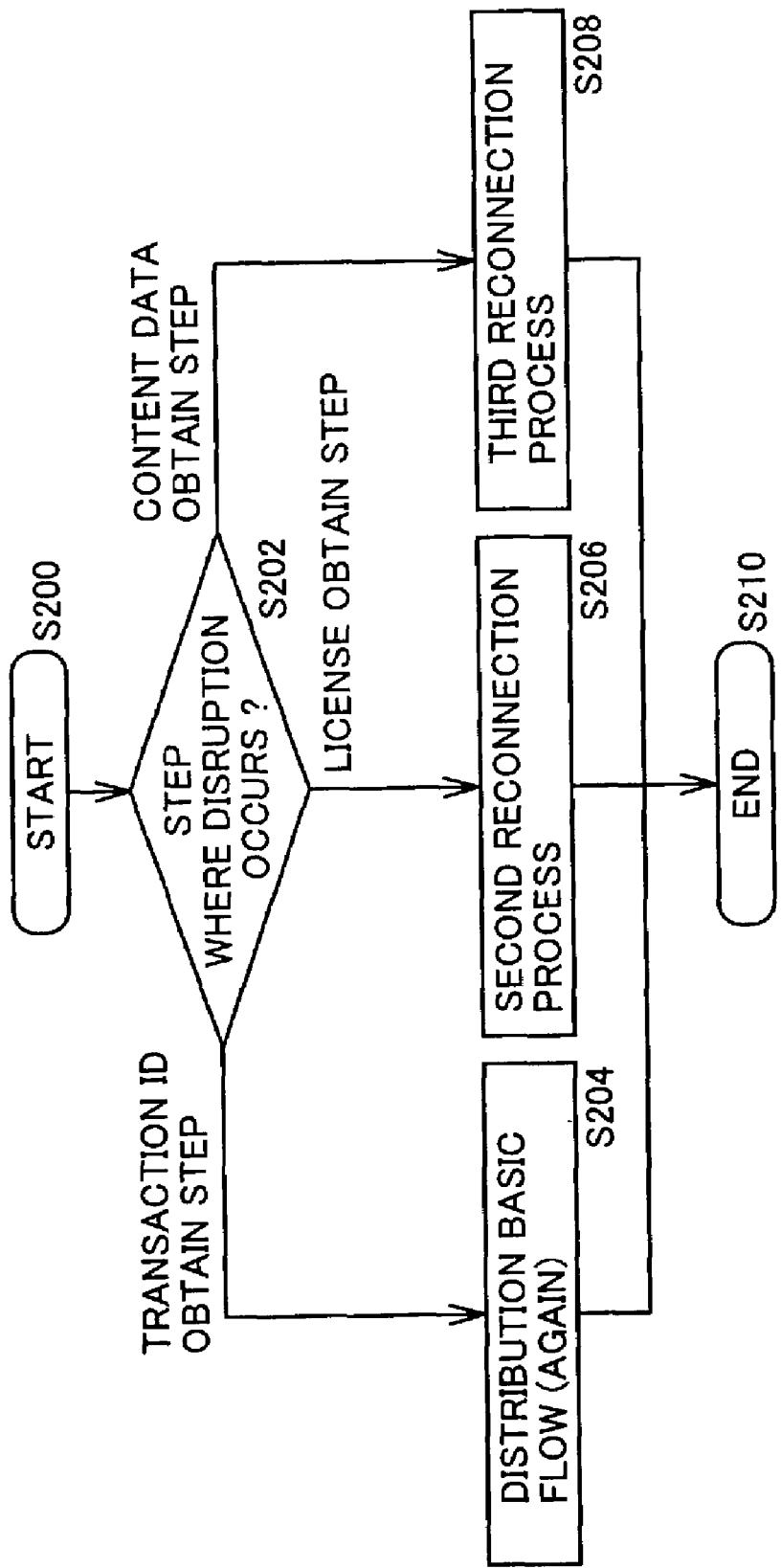
FIG. 9 is a flow chart to describe a reconnection process.

The process when reconnection is to be established to receive distribution again when the communication line is disrupted during the stage of the above-described process of the distribution operation will be described hereinafter. FIG. 9 is a flow chart to describe a reconnection process.

User 1, for example, requests reconnection through the key button or the like on keyboard 1108 of cellular phone 100, whereby the reconnection process is initiated (step S200).

Controller 1106 of cellular phone 100 determines the processing step where communication was disrupted (step S202). If disruption has occurred in the transaction ID obtain step, the basic distribution process of FIGS. 6-8 (first reconnection process) is effected since it is not relevant to accounting (step S204). Then, the reconnection process ends (step S206).

When determination is made that the step where communication has been disrupted is the license obtain step (step S202), controller 1106 carries out a second reconnection process based on a reception log that will be described afterwards (step S206). When communication has been disrupted in the content data obtain step (step S202), a third reconnection process to continue communication corresponding to communication disruption that will be described afterwards is effected (step S206). Then, the reconnection process ends (step S210).

[Second Reconnection Process]

Figure 10:
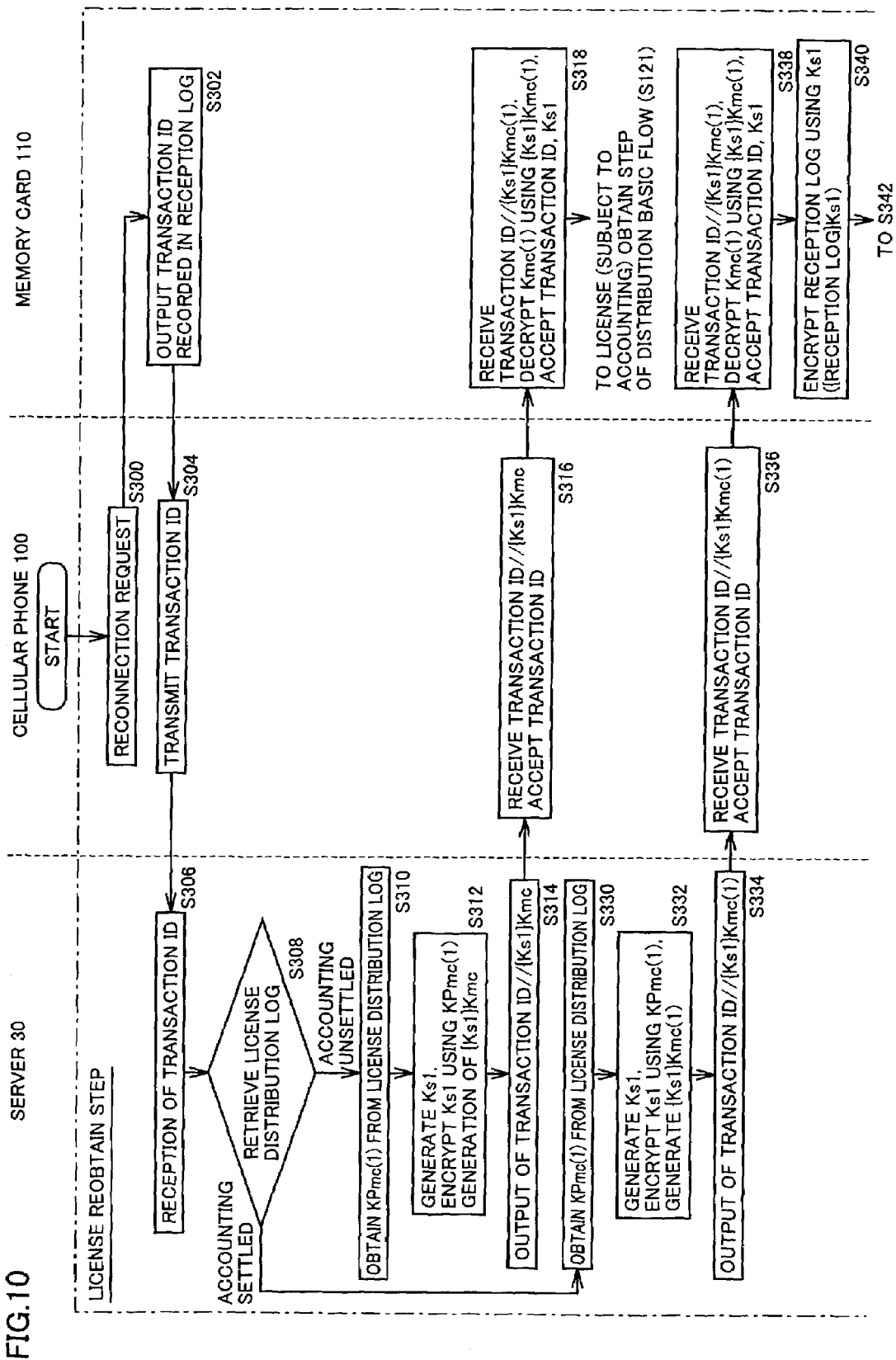
FIG. 10 is a first flow chart to describe a second reconnection operation of the data distribution system according to the first embodiment.
Figure 11:
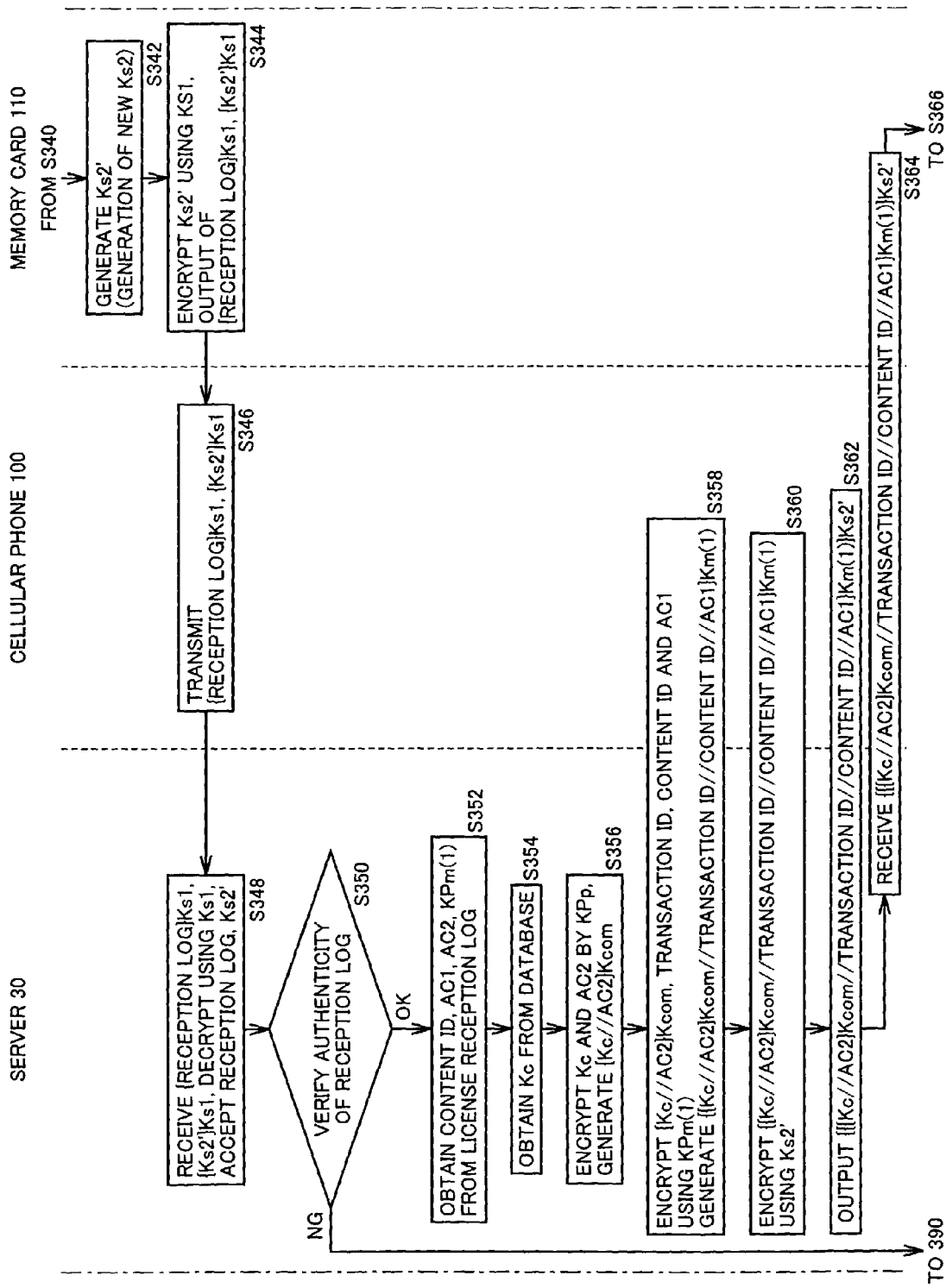
FIG. 11 is a second flow chart to describe a second reconnection operation of the data distribution system according to the first embodiment.
Figure 12:
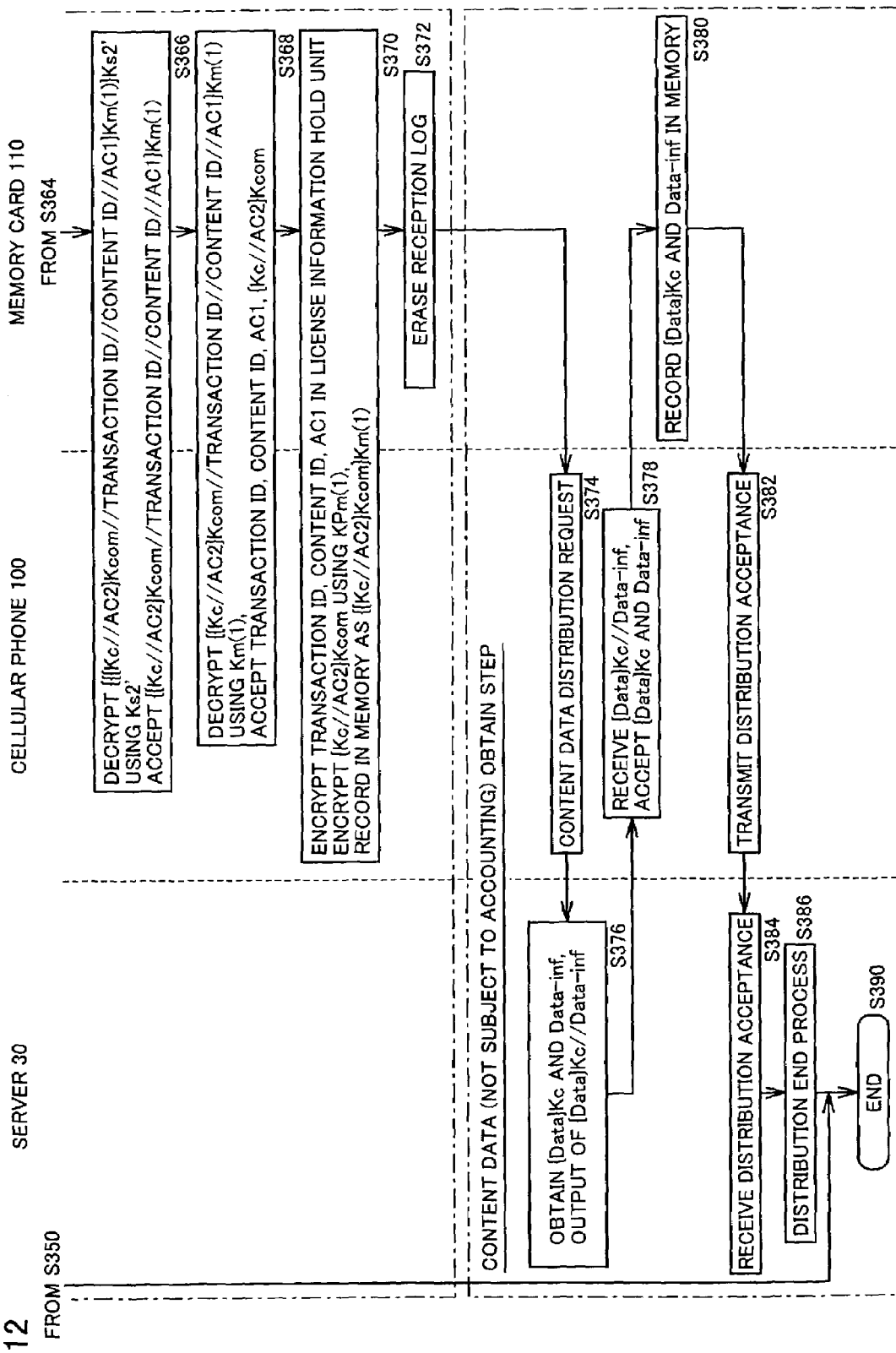
FIG. 12 is a third flow chart to describe a second reconnection operation of the data distribution system according to the first embodiment.

FIGS. 10, 11 and 12 are the first, second and third flow charts, respectively, to describe a second reconnection process in the data distribution system of the first embodiment. By comparing the license distribution log of license server 10 and the reception log of memory card 110, the reproduction information distribution status when communication has been disrupted is confirmed to realize reliability for the user while protecting the rights of copyright owners.

Referring to FIG. 10, user 1 operates the key button of keyboard 1108 of cellular phone 100 to issue a reconnection request. In response, the second reconnection process is initiated (step S300).

In response to this reconnection request, the transaction ID stored in log memory 1460 is output at memory card 110 (step S302).

Cellular phone 100 transmits the transaction ID accepted from memory card 110 towards distribution server 30 (step S304).

At distribution server 30, the transaction ID is received (step S306). Distribution control unit 315 retrieves the license distribution log from log administration database 306 (step S308).

When an accounting process has been already performed for the terminal that has requested reconnection (cellular phone 100 and memory card 110) from the received transaction ID (step S308), distribution control unit 315 obtains public encryption key KPmc(1) from the license distribution log (step S310).

Session key generation unit 316 generates a session key Ks1 for distribution. Session key Ks1 is encrypted by encryption processing unit 318 using public encryption key KPmc(1) (step S312).

The transaction ID and encrypted session key {Ks1}Kmc(1) are output via data bus BS1 and communication device 350 (step S314).

In response to reception of the transaction ID and encrypted session key {Ks1}Kmc(1) at cellular phone 100 (step S316), decryption processing unit 1404 of memory card 110 decrypts the received data applied onto data bus BS3 via memory interface 1200 using a private decryption key Kmc(1) unique to memory card 110 stored in hold unit 1402, whereby session key Ks1 is decrypted and extracted (step S318).

The subsequent steps are similar to the process after step S121 of FIG. 7, i.e., the process following the license obtain step.

When determination is made that the accounting process has not been completed as a result of looking in the license distribution log from log administration database 306 by distribution control unit 315 at step S308, public encryption key KPmc(1) is obtained from the license distribution log (step S330).

Then, session key generation unit 316 at distribution server 30 generates a session key Ks1 for distribution. Session key Ks1 is encrypted by encryption processing unit 318 using public encryption key KPmc(1) (step S332).

The transaction ID and encrypted session key {Ks1}Kmc(1) are output via data bus BS1 and communication device 350 (step S334).

In response to reception of the transaction ID and encrypted session key {Ks1}Kmc(1) at cellular phone 100 (step S336), decryption processing unit 1404 decrypts the reception data applied onto data bus BS3 via memory interface 1200 using private decryption key Kmc(1) unique to memory card 110 stored in hold unit 1402, whereby session key Ks1 is decrypted and extracted (step S338).

Encryption processing unit 1406 encrypts the received log with session key Ks1 to generate {reception log}Ks1 (step S340).

Referring to FIG. 11, controller 1420 designates session key generation unit 1418 to generate a session key Ks2' generated in the distribution operation of the memory card (step S342).

Encryption processing unit 1406 encrypts session key Ks2' applied via the contacts of switches 1444 and 1446 using session key Ks1 applied from decryption processing unit 1404 via contact Pa of switch 1442 to generate {Ks2'}Ks1. The generated data {reception log}Ks1 and {Ks2'}Ks1 are output from memory card 110 (step S344).

Encrypted data {reception log}Ks1 and {Ks2'}Ks1 output onto data bus BS3 are transmitted from data bus BS3 to cellular phone 100 via terminal 1202 and memory interface 1200, and transmitted from cellular phone 100 to distribution server 30 (step S346).

Distribution server 30 receives encrypted data {reception log}Ks1 and {Ks2'}Ks1. Decryption processing unit 320 executes a decryption process using session key Ks1, whereby session key Ks2' generated by the reception log and memory card is accepted (step S348).

Then, distribution control unit 316 verifies the authenticity of the received reception log (step S350).

When authenticity of the reception log is not verified, the second reconnection process ends (step S390).

In contrast, when the authenticity of the reception log is verified, distribution control unit 315 obtains the content ID, access restriction information AC1, reproduction circuit restriction information AC2 and public encryption key KPm(1) from the license distribution log (step S352). Then, license key Kc to decrypt the encrypted content data is obtained from information database 304 (step S354).

Distribution control unit 315 applies the obtained license key Kc and reproduction circuit restriction information AC2 to encryption processing unit 324. Encryption processing unit 324 encrypts license key Kc and reproduction circuit restriction information AC2 using secret common key Kcom obtained from Kcom hold unit 322 (step S356).

Encrypted data {Kc//AC2}Kcom output from encryption processing unit 324 and the transaction ID, content ID and access restriction information AC1 output from distribution control unit 315 are encrypted by encryption processing unit 326 using public encryption key KPm(1) unique to memory card 110 obtained at step S352 (step S358).

Encryption processing unit 328 receives the output of encryption processing unit 326 to encrypt the output using session key Ks2' generated at memory card 110 (step S360).

Encrypted data {{{Kc//AC2}Kcom//transaction ID//content ID//AC1}Km(1)}Ks2' output from encryption processing unit 328 is transmitted to cellular phone 100 via data bus BS1 and communication device 350 (step S362).

Cellular phone 100 receives the transmitted encryption data {{{Kc//AC2}Kcom//transaction ID//content ID//AC1}Km(1)}Ks2' (step S364).

Referring to FIG. 12, memory card 110 has the reception data applied onto data bus BS3 via memory interface 1200 decrypted by decryption processing unit 1412. Specifically, decryption processing unit 1412 uses session key Ks2' applied from session key generation unit 1418 to decrypt the reception data on data bus BS3, and provides the decrypted data onto data bus BS4 (step S366).

At this stage, data {{Kc//AC2}Kcom//transaction ID//content ID//AC1}Km(1) decryptable with private decryption key Km(1) stored in Km(1) hold unit 1421 is output onto data bus BS4. This data {{Kc//AC2}Kcom//transaction ID//content ID//AC1}Km(1) is decrypted with private decryption key Km(1), whereby data {Kc//AC2}Kcom, the transaction ID, the content ID, and access restriction information AC1 corresponding to the reproduction information are accepted (step S368).

The transaction ID, content ID, access restriction information AC1 are stored in license information hold unit 1440. Data {Kc//AC2}Kcom is encrypted again using a private decryption key KPm(1) and stored in memory 1415 as data {{Kc//AC2}Kcom}Km(1) (step S370).

Also, the reception log is erased from log memory 1460 (step S372).

At the stage of proper completion of the process up to step S372, a content data distribution request is issued from cellular phone 100 to distribution server 30 (step S374).

In response to this content data distribution request, distribution server 30 obtains encrypted content data {Data}Kc and additional information Data-inf from information database 304. These data are output via data bus BS1 and communication device 350 (step S376).

Cellular phone 100 receives {Data}Kc//Data-inf, and accepts encrypted content data {Data}Kc and additional information Data-inf (step S378). Encrypted content data {Data}Kc and additional information Data-inf are transmitted onto data bus BS3 of memory card 110 via memory interface 1200 and terminal 1202. At memory card 110, the received encrypted content data {Data}Kc and additional information Data-inf are directly stored in memory 1415 (step S380).

A distribution reception notification is transmitted from memory card 110 to distribution server 30 (step S382). When the distribution acceptance is received at distribution server 30 (step S384), the distribution end process is executed (step S386). The process of the distribution server ends (step S390).

[Third Reconnection Process]

Figure 13:
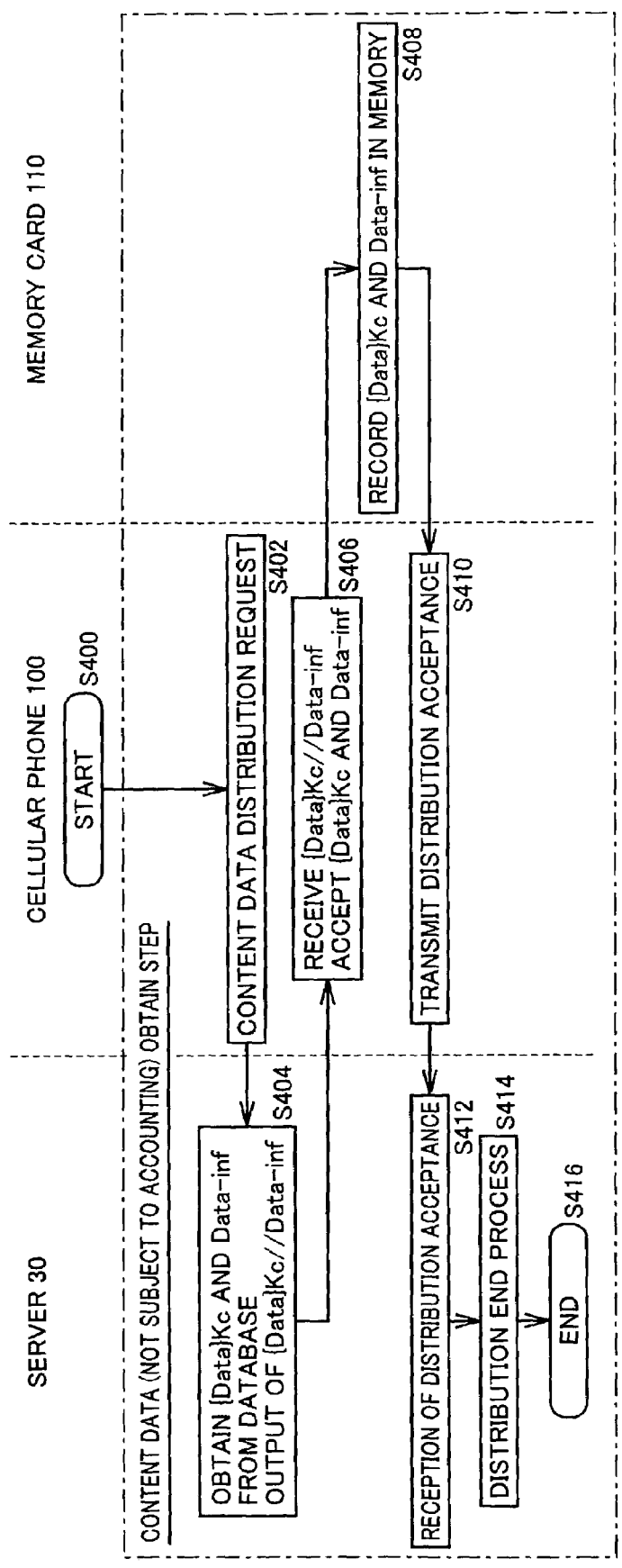
FIG. 13 is a flow chart to describe a third reconnection operation of the data distribution system according to the first embodiment.

FIG. 13 is a flow chart to describe a third reconnection operation in the data distribution system of the first embodiment.

Referring to FIG. 13, user 1 sends a reconnection request through the key button on keyboard 1108 of cellular phone 100. In response, a third reconnection process is initiated (step S400).

In response to this reconnection request, cellular phone 100 sends a content data distribution request to distribution server 30 (step S402).

In response to this content data distribution request, distribution server 30 obtains encrypted content data {Data}Kc and additional information Data-inf from information database 304. These data are output via data bus BS1 and communication device 350 (step S404).

Cellular phone 100 receives {Data}Kc//Data-inf, and accepts encrypted content data {Data}Kc and additional information Data-inf (step S406). Encrypted content data {Data}Kc and additional information Data-inf are transmitted onto data bus BS3 of memory card 110 via memory interface 1200 and terminal 1202. At memory card 110, the received encrypted content data {Data}Kc and additional information Data-inf are directly stored in memory 1415 (step S408).

Then, a distribution acceptance notification is transmitted from memory card 110 to distribution server 30 (step S410). When distribution server 30 receives this distribution acceptance (step S412), a distribution end process is executed (step S414). The process of the distribution server ends (step S416).

[Reconnection Operation When Line Is Cut During Reconnection Operation]

Figure 14:
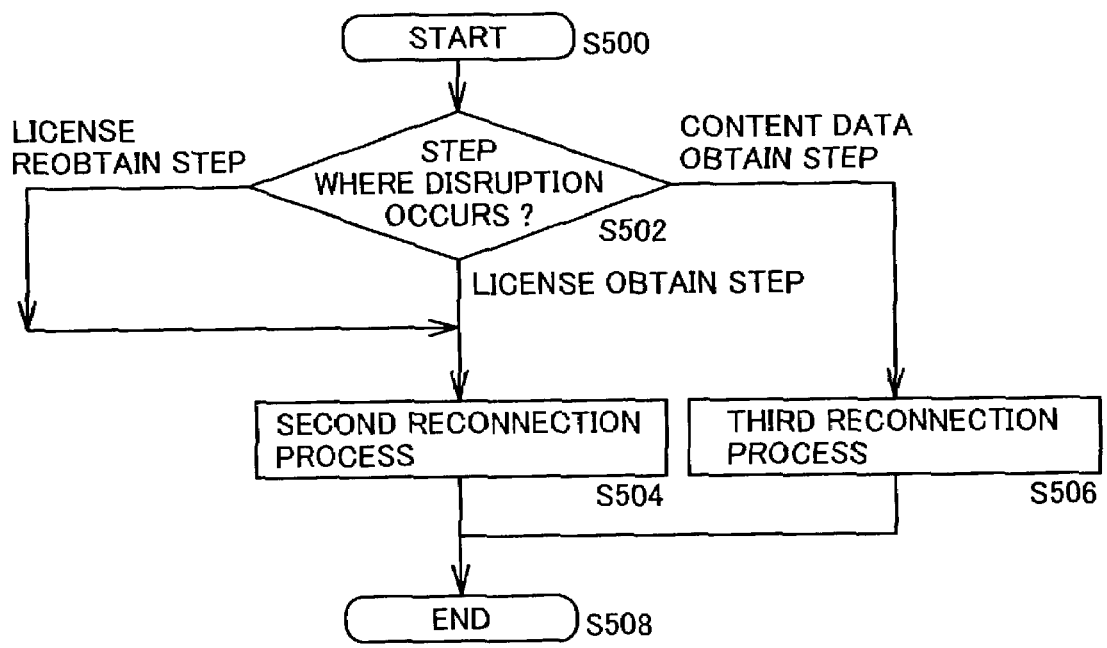
FIG. 14 is a flow chart to describe a reconnection process.

The process of establishing reconnection to receive distribution again in the case where the communication line is cut off in the stage of the processing step of the above-described reconnection operation will be described here. FIG. 14 is a flow chart to describe such a reconnection process.

User 1, for example, operates the key button on keyboard 1108 of cellular phone 100 to send a reconnection request. The reconnection process is initiated (step S500).

Based on the license reception standby log stored in memory card 110, controller 1106 determines the step where communication has been disrupted (step S502). When communication has been disrupted at the license obtain step or license reobtain step, the second reconnection process is performed again (step S504). Then, the reconnection process ends (step S508).

When determination is made that the step where communication has been disrupted is the content data obtain step by controller 1106 (step S502), a third reconnection process that will be described afterwards is carried out (step S506). Then, the reconnection process ends (step S508).

By virtue of such a structure, reconnection can be established even in the case where the communication line has been disrupted in the processing step. Thus, the reliability of the system is further improved.

SECOND EMBODIMENT

The data distribution system of the second embodiment differs in the data distribution system of the first embodiment in that the license reception standby log stored in log memory 1460 in memory card 110 is not erased, as will be described hereinafter. Corresponding to this modification, the reception log includes, in addition to the structure of the first embodiment, a reception status flag.

The data distribution system of the second embodiment differs from the first embodiment in the operation of controller 1420 in memory card 110 and the data stored in log memory 1460.

Figure 15:
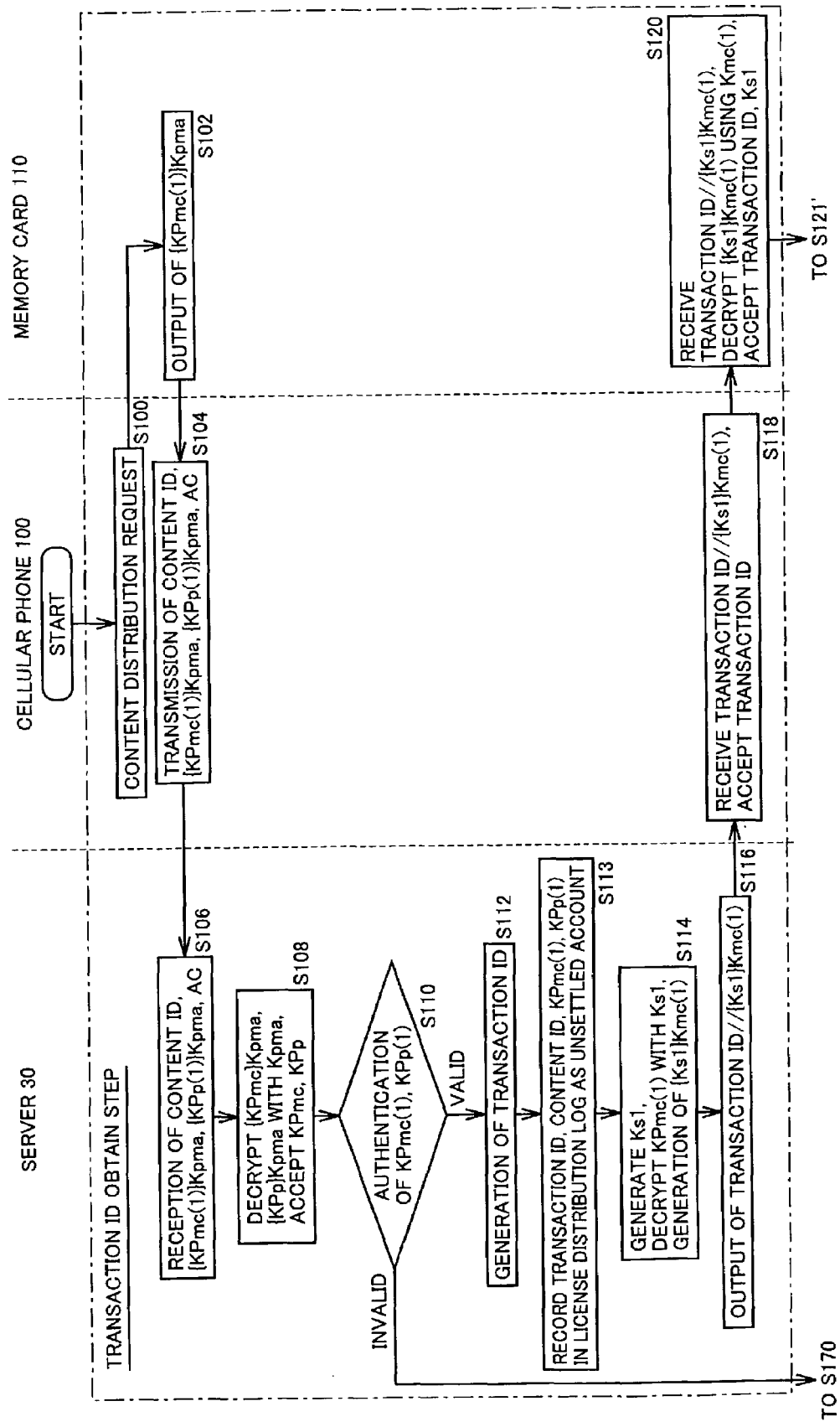
FIG. 15 is a first flow chart to describe a distribution operation in the event of purchasing content in the data distribution system according to a second embodiment.
Figure 16:
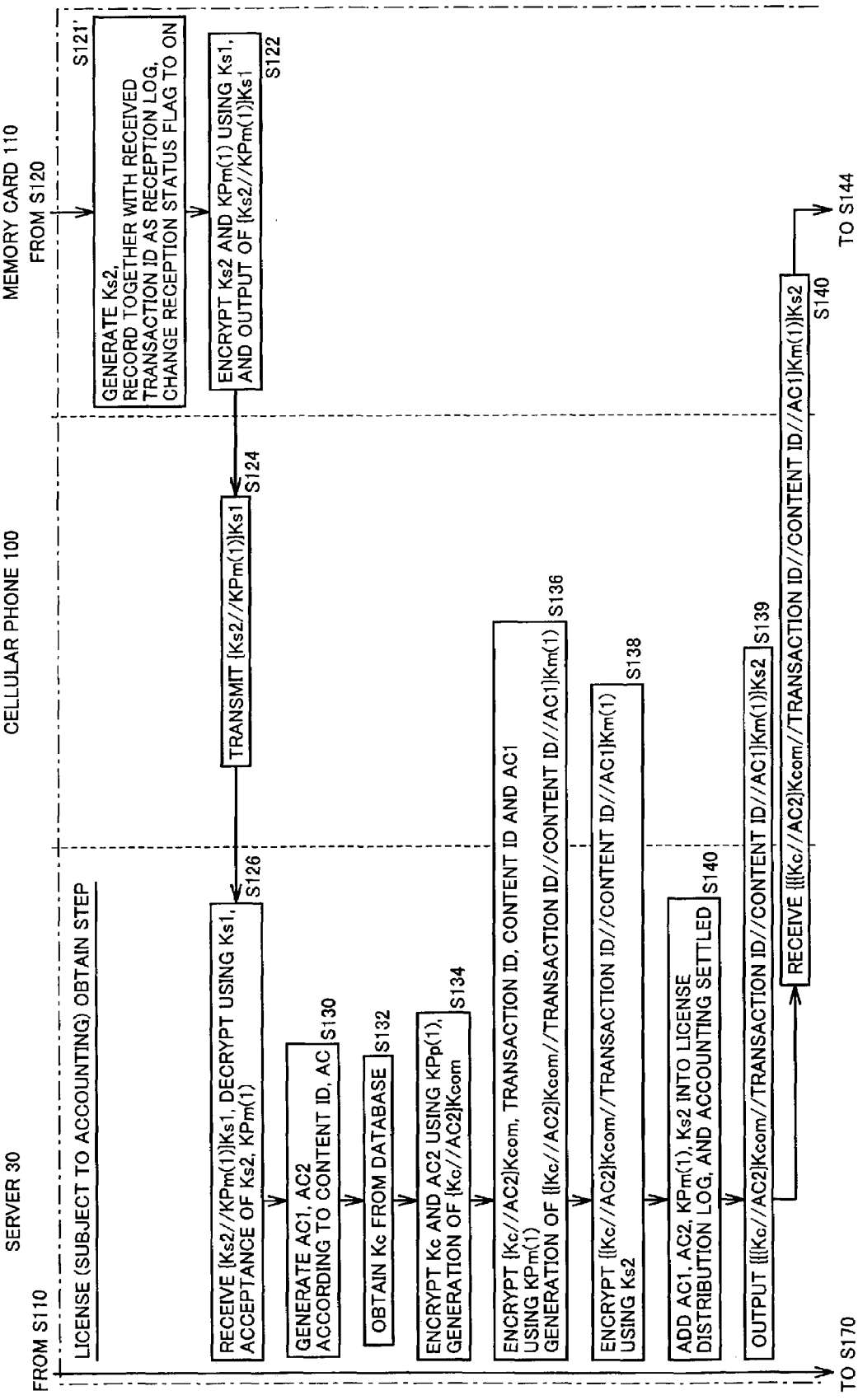
FIG. 16 is a second flow chart to describe a distribution operation in the event of purchasing content in the data distribution system according to the second embodiment.
Figure 17:
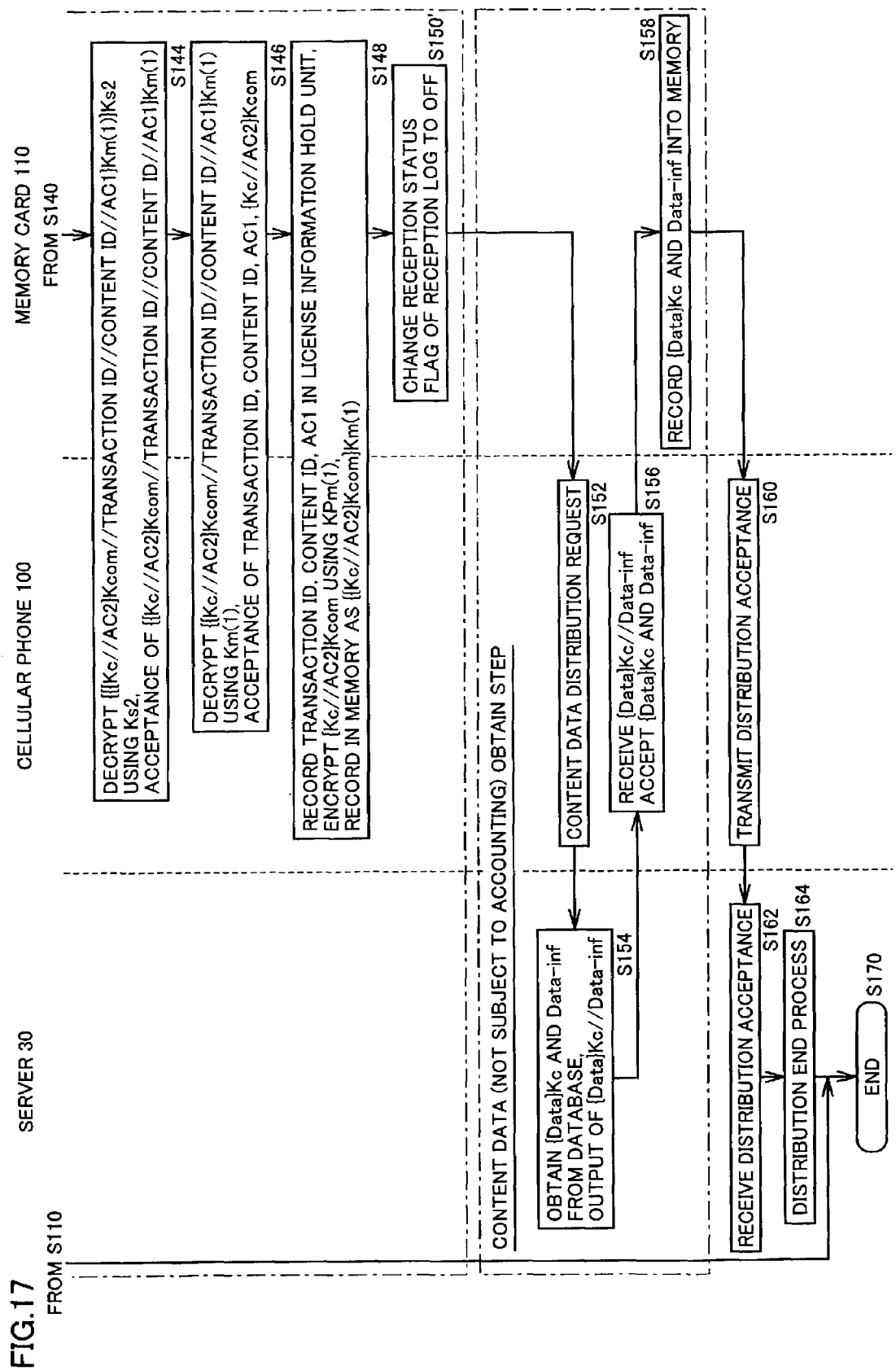
FIG. 17 is a third flow chart to describe a distribution operation in the event of purchasing content in the data distribution system according to the second embodiment.

FIGS. 15, 16 and 17 are the first, second and third flow charts, respectively, to describe a distribution operation in the event of purchasing content in the data distribution system of the second embodiment, and is comparable to FIGS. 6-8 of the first embodiment.

FIGS. 15-17 correspond to the operation of user 1 receiving music data distribution from distribution server 30 via cellular phone 100 by using memory card 110.

The difference from the flow of the first embodiment is that, at step S121' of FIG. 16 following the transaction ID obtain step, controller 1420 designates session key generation unit 1418 to generate a session key Ks2 generated during the distribution operation of the memory card upon confirming acceptance of session key Ks1 generated at distribution server 30. Furthermore, controller 1420 records a reception status flag attaining an ON status indicating a reception wait state as the reception log in log memory 1460 together with session key Ks2 and the received transaction ID (step S121').

Referring to FIG. 17, at step S148, the transaction ID, content ID and access restriction information AC1 are recorded in license information hold unit 1440. Data {Kc//AC2}Kcom is encrypted by public encryption key KPm(1), and stored in memory 1415 as data {{Kc//AC2}Kcom}Km(1). Then, the reception status flag in the reception log in log memory 1460 attains an OFF status indicating that reception has ended (step S150').

The remaining process is similar to that of the first embodiment. The same steps have the same reference characters allotted, and description thereof will not be repeated.

[Reconnection Operation]

Similar to FIG. 9 of the first embodiment, the second embodiment carries out a reconnection process to receive distribution again when the communication line has been disrupted at the stage of the processing step of the distribution operation.

It is to be noted that the second reconnection process is partially modified from that of the first embodiment.

[Second Reconnection Process]

Figure 18:
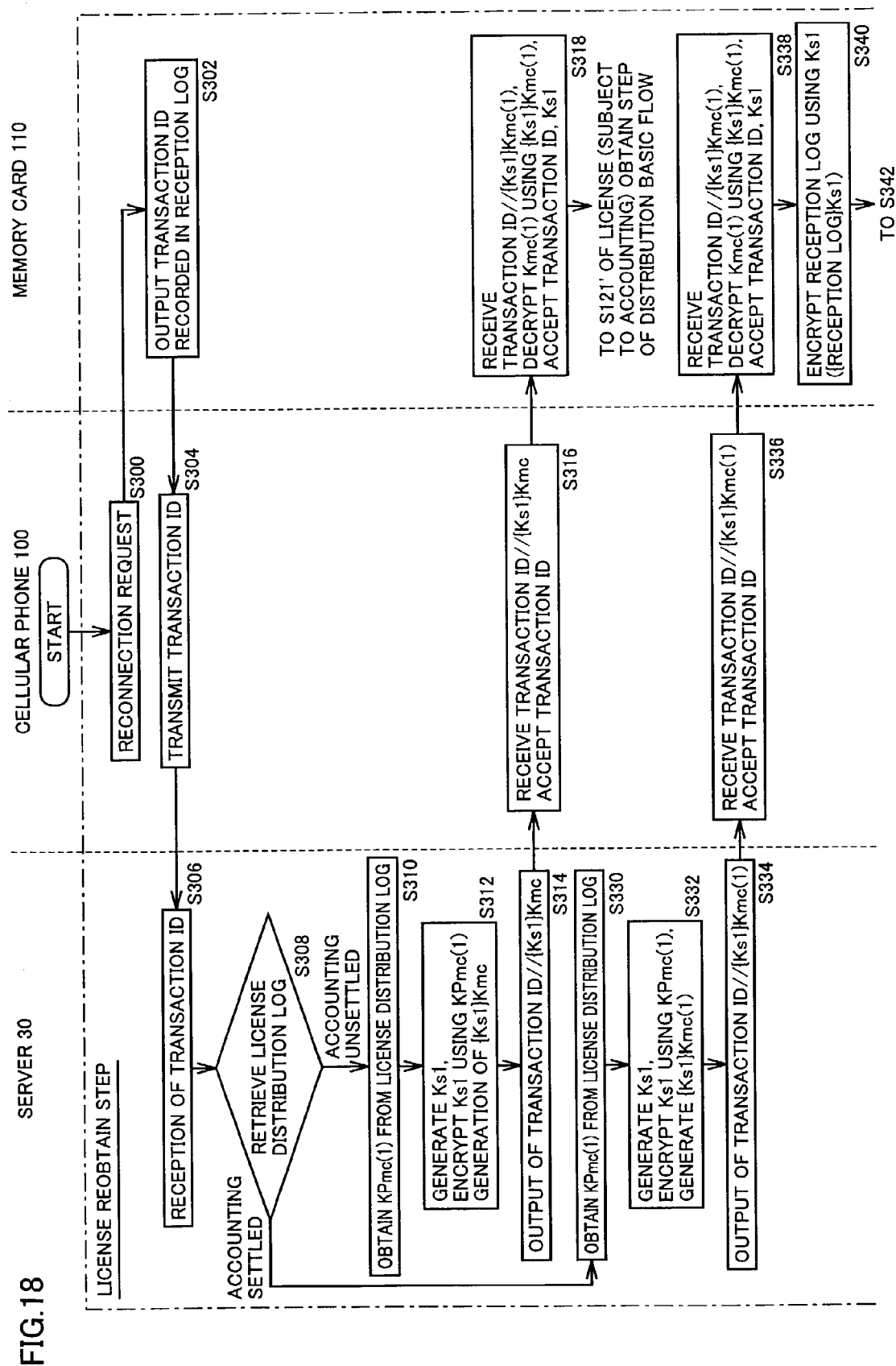
FIG. 18 is a first flow chart to describe a second reconnection operation of the data distribution system of the second embodiment.
Figure 19:
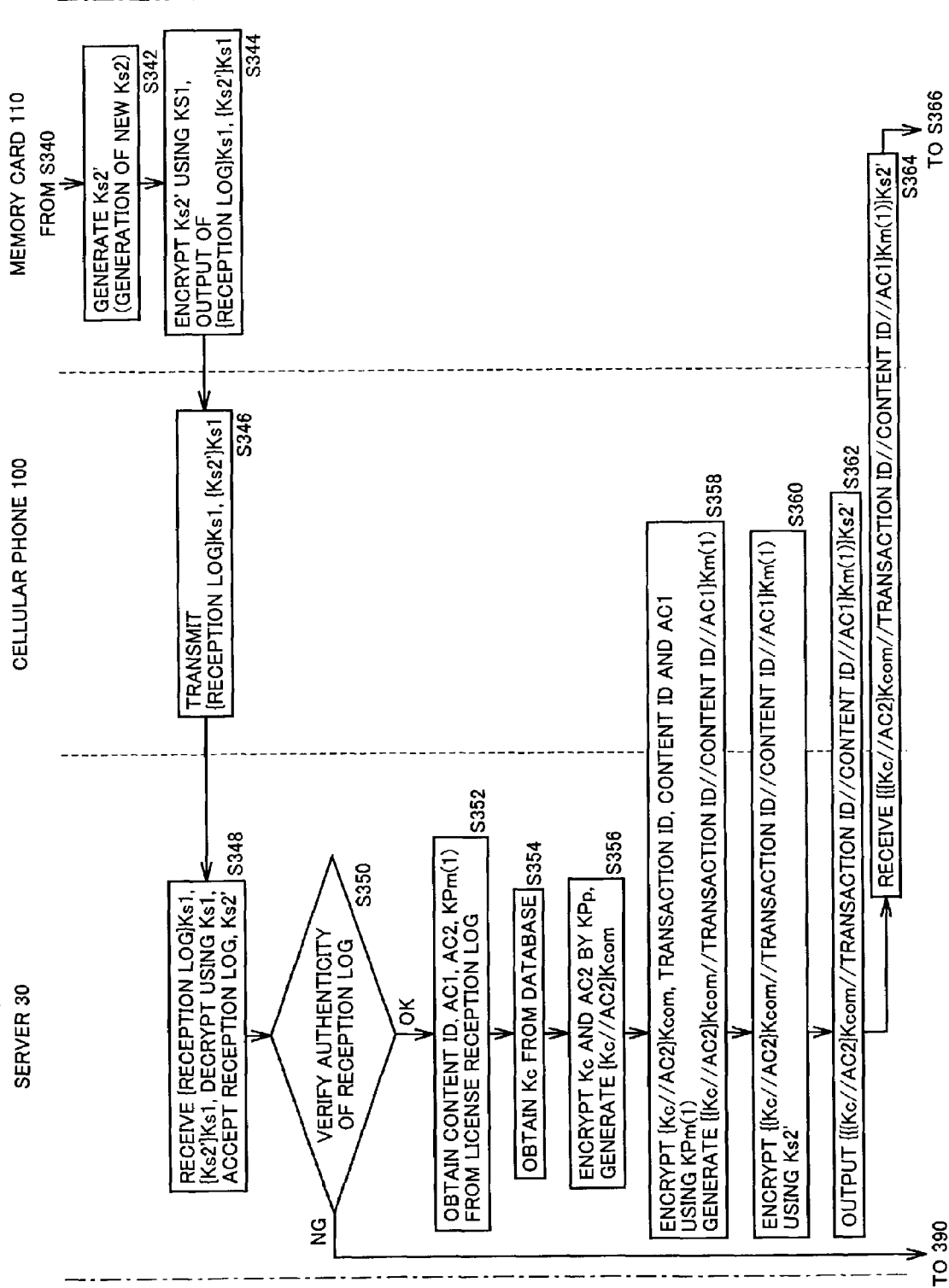
FIG. 19 is a second flow chart to describe a second reconnection operation of the data distribution system of the second embodiment.
Figure 20:
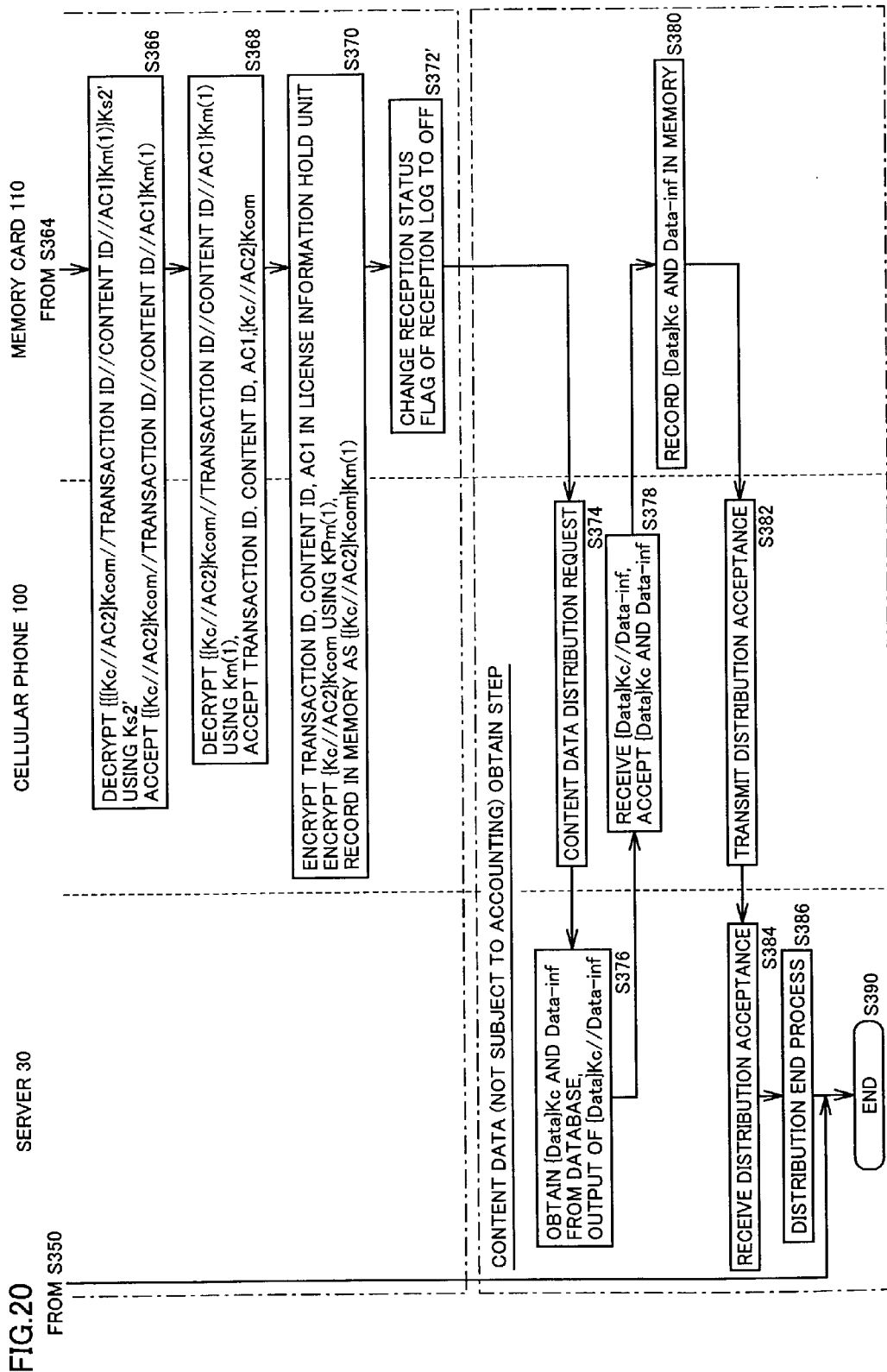
FIG. 20 is a third flow chart to describe a second reconnection operation of the data distribution system of the second embodiment.

FIGS. 18, 19 and 20 are the first, second and third flow charts, respectively, to describe a second reconnection operation in the data distribution system of the second embodiment, and are comparable to FIGS. 10-12 of the first embodiment.

Difference from the process of the first embodiment is that control proceeds to step S121' of FIG. 16 after accepting session key Ks1 at step S318, and the transaction ID, content ID and access restriction information AC1 are recorded in license information hold unit 1440 at step S370 shown in FIG. 20. Data {Kc//AC2}Kcom is encrypted using public encryption key KPm(1), and stored in memory 1415 as data {{Kc//AC2}Kcom}Km(1). Then at step S372', a process of rendering the reception status flag of the reception log OFF indicating that reception has ended is carried out.

The remain process is similar to that of first embodiment. Corresponding steps have the same reference characters allotted, and description thereof will not be repeated.

The third reconnection process as well as the reconnection operation when the line is cut off during a reconnection operation are similar to the process of FIG. 1.

By such a structure, reconnection can be established even in the case where the communication line is disrupted in the processing step. Thus, the reliability of the system is further improved.

THIRD EMBODIMENT

The distribution system of the third embodiment differs from the data distribution system of the second embodiment in that status information with a status flag is transmitted to the server in the reception log stored in log memory 1460 in memory card 110.

The status information includes the transaction ID, session key Ks2, reception status flag and status flag corresponding to the reception log.

Here, the license status flag is a flag variable of 3 states. The license status flag takes the value of "01h" when the transaction ID recorded in the reception log is present in license information hold unit 1440 of memory card 110, corresponding reproduction information is present, and reproduction is not inhibited by the access restriction information stored in license information hold unit 1440, i.e. when in a reproducible state; takes the value of "00h" when there is the transaction ID in the license information hold unit, and there is no corresponding reproduction information or when reproduction is inhibited by the access restriction information stored in license information hold unit 1440 so that reproduction cannot be performed; and takes the value of "FFh" when there is no transaction ID.

The structure of the data distribution system of the third embodiment differs in the operation of controller 1420 of memory card 110 and the data stored in log memory 1460 as will be described hereinafter.

The distribution operation and reconnection operation of the third embodiment are similar to those of the second embodiment except for the second reconnection process set forth below.

[Second Reconnection Process]

FIGS. 21, 22, 23 and 24 are the first, second, third and fourth flow charts, respectively, to describe the second reconnection operation of the data distribution system of the third embodiment.

Figure 21:
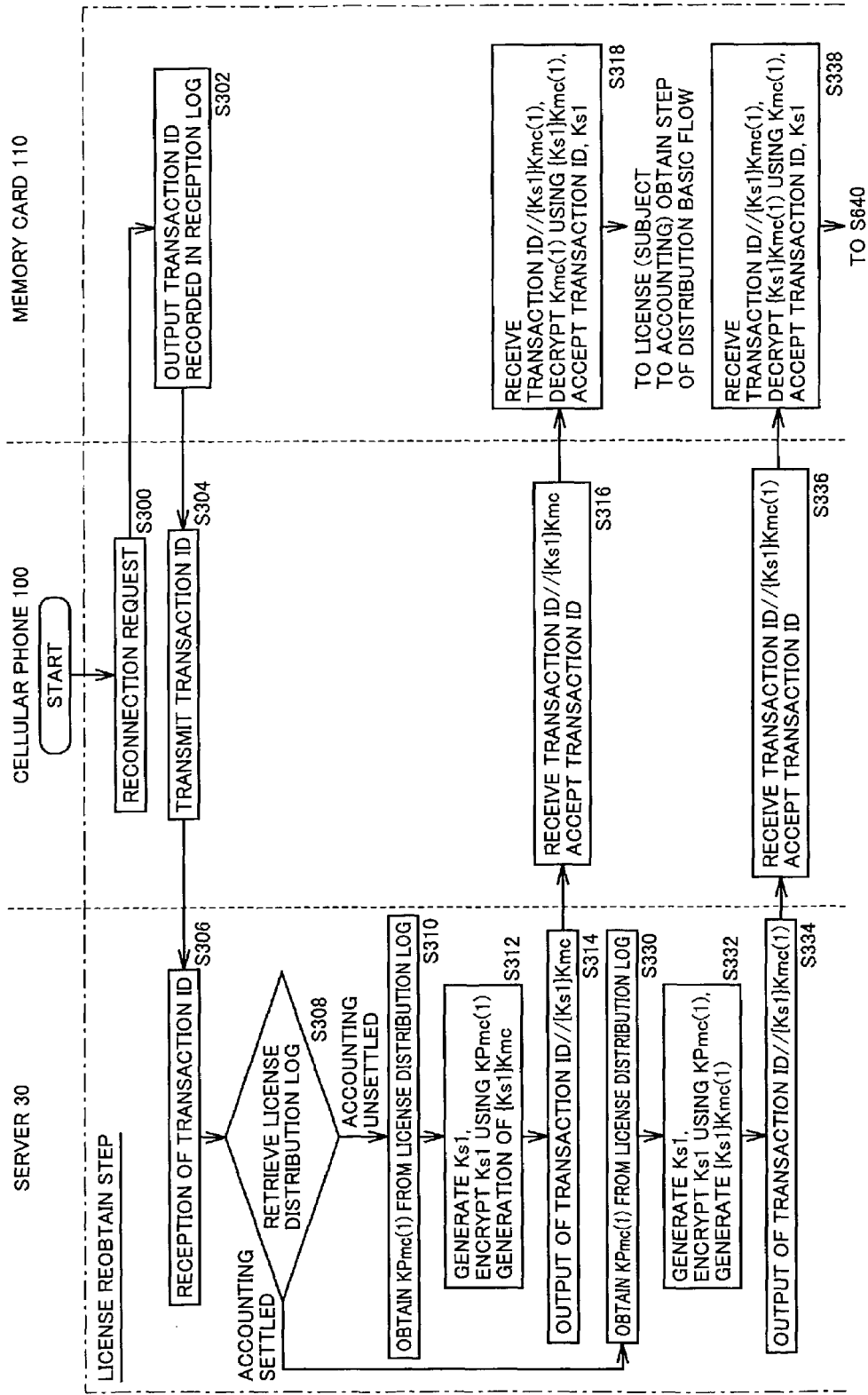
FIG. 21 is a first flow chart to describe a second reconnection operation of the data distribution system according to a third embodiment of the present invention.
Figure 22:
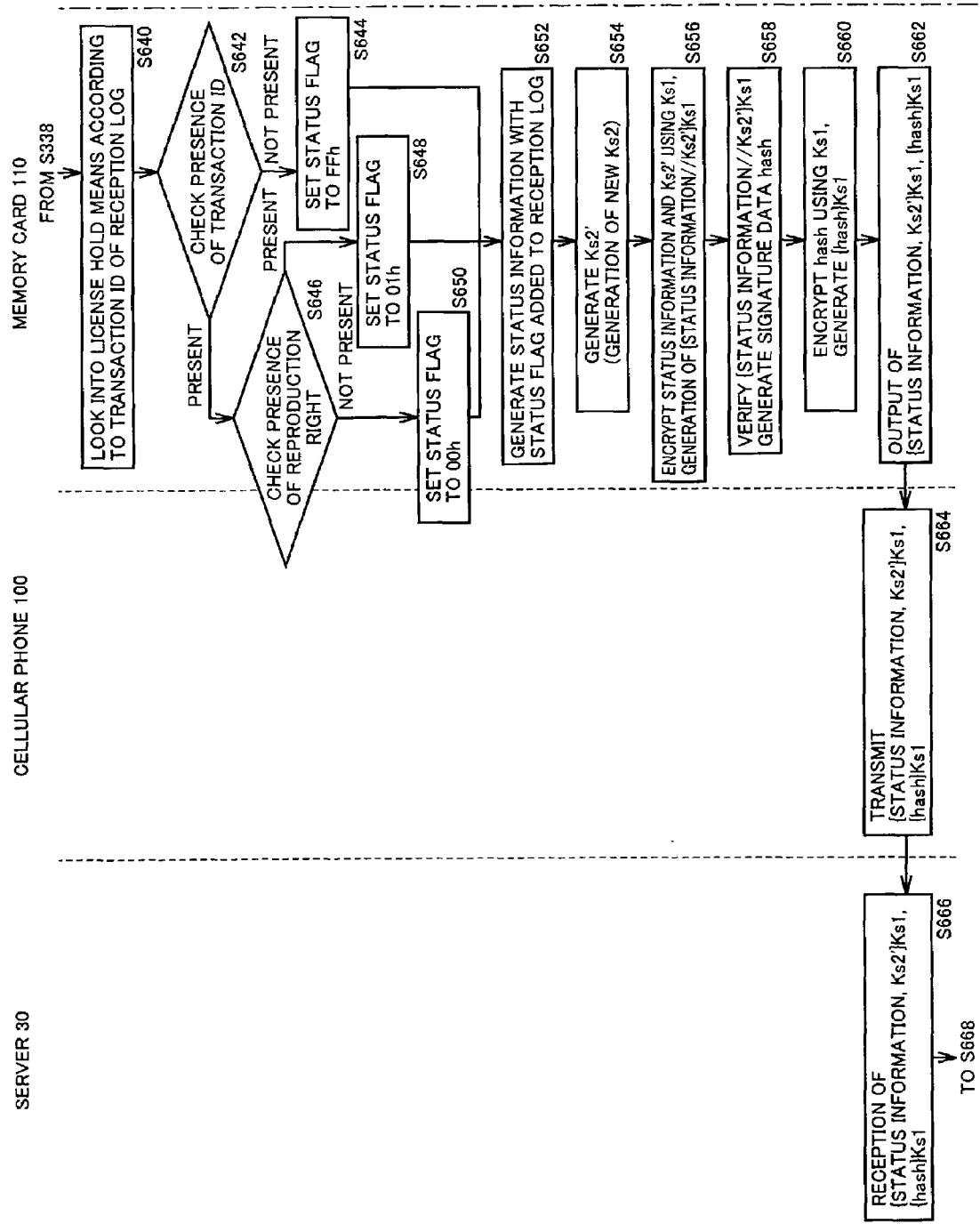
FIG. 22 is a second flow chart to describe a second reconnection operation of the data distribution system according to the third embodiment of the present invention.

Referring to FIG. 21, the process from step S300 to step S338 is similar to the second reconnection operation of the second embodiment.

At step S338, the reception data applied onto data bus BS3 via memory interface 1200 in memory card 110 is decrypted by decryption processing unit 1404 using private decryption key Kmc(1) unique to memory card 110 stored in hold unit 1402, whereby session key Ks1 is decrypted and extracted. Then, controller 1420 in memory card 110 retrieves data stored in license information hold unit 1440 according to the transaction ID in the reception log stored in log memory 1460 (step S640).

Controller 1420 checks whether there is a transaction ID in license information hold unit 1440 (step S642).

When there is no transaction ID, the license status flag is set to "FFh" (step S644), and control proceeds to step S652.

When there is the transaction ID at step S642, controller 1420 confirms the status of access restriction information AC1 stored in license information hold unit 1440 and whether a corresponding license key Kc is recorded in memory 1415 (step S646). When reproduction is allowed, the license status flag is set to "01h" (step S648). When reproduction is not allowed, the license status flag is set to "00h" (step S650). Then, control proceeds to step S652).

The status information with the status flag added to the reception log stored in log memory 1460 is generated (step S652).

Controller 1462 designates session key generation unit 1418 to generate a session key Ks2' generated in the distribution operation of the memory card (step S654).

Decryption processing circuit 1406 decrypts the status information and session key Ks2' using session key Ks1 (step S656).

Controller 1420 obtains the hash value according to the hash function corresponding to encrypted data {status information//Ks2'}Ks1 to generate signature data "hash" for encrypted data {status information//Ks2'}Ks1 (step S658).

Encryption processing unit 1406 encrypts the signature data hash applied under control of controller 1420 using session key Ks1 applied from decryption processing unit 1402 via contact Pa of switch 1442 to generate encrypted signature data {hash}Ks1 (step S660).

The generated data {status information//Ks2'}Ks1 and encrypted signature data {hash}Ks1 are output from memory card 110 (step S662).

Encrypted data {status information//Ks2'}Ks1 and encrypted signature data {hash}Ks1 output onto data bus BS3 are transmitted from data bus BS3 to cellular phone 100 via terminal 1202 and memory interface 1200, and transmitted from cellular phone 100 to distribution server 30 (step S644).

Distribution server 30 receives encrypted data {status information//Ks2'}Ks1 and encrypted signature data {hash}Ks1 (step S666).

Figure 23:
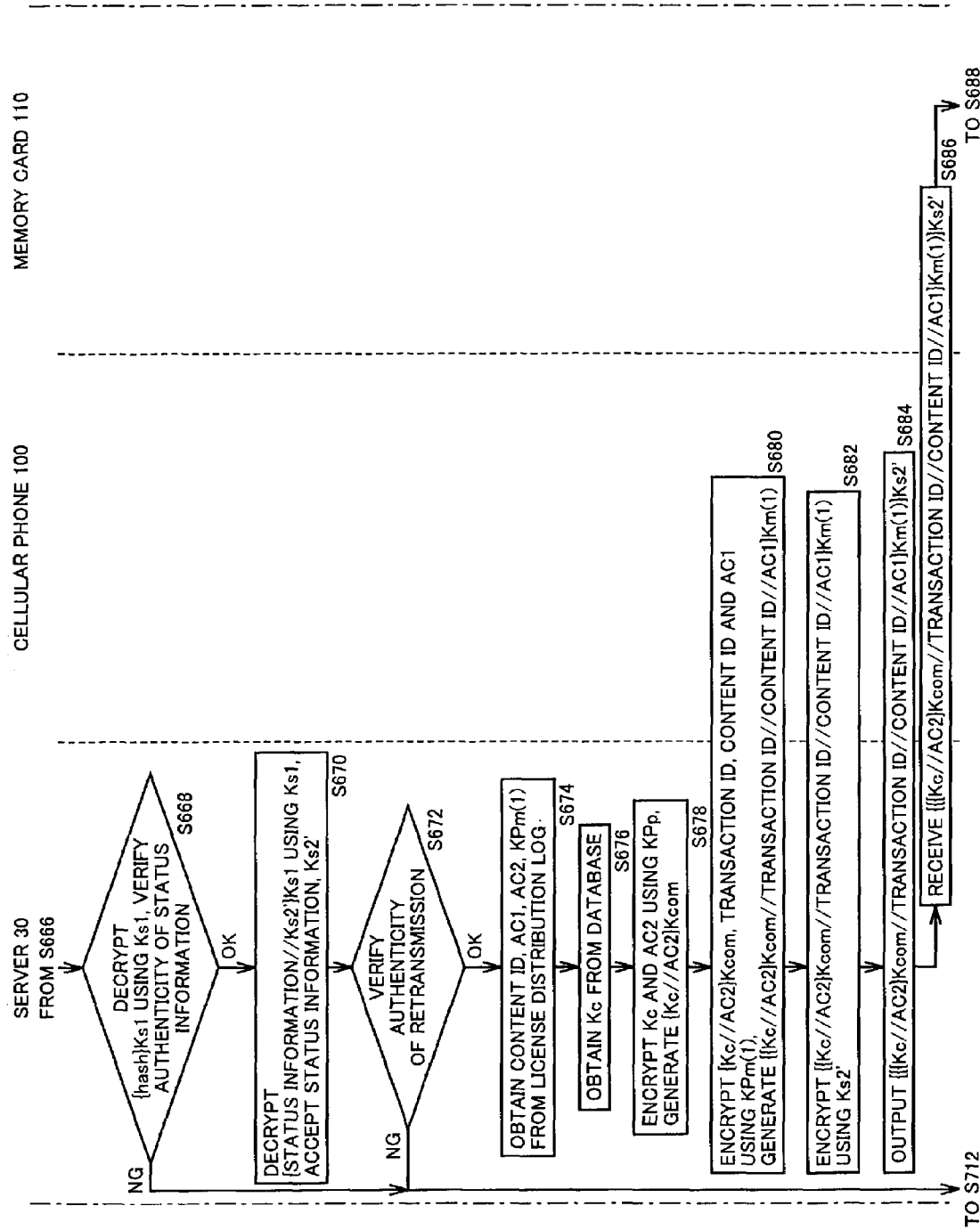
FIG. 23 is a third flow chart to describe a second reconnection operation of the data distribution system according to the third embodiment of the present invention.

Referring to FIG. 23, decryption processing unit 320 of distribution server 30 executes a decryption process on encrypted signature data {hash}Ks1 using session key Ks1 to obtain signature data hash corresponding to encrypted data {status information//Ks2'}Ks1. Then, the authenticity of the status information is checked based on encrypted data {status information//Ks2'}Ks1 and the signature data (step S668).

The process ends if the status information is not proper (step S712). When the authenticity of the status information is verified, a decryption process is executed using session key Ks1. The status information and session key KS2' generated by the memory card are accepted (step S670).

Distribution control unit 315 verifies the authenticity of the reproduction information retransmission request based on the received status information and license distribution log (step S672).

When the authenticity of the reproduction information retransmission request is not verified, the second reconnection process ends (step S712).

In contrast, if the authenticity of the reproduction information transmission request is verified, distribution control unit 315 obtains the content ID, access restriction information AC1, reproduction circuit restriction information AC2 and public encryption key KPm(1) from the license distribution log (step S674). Then, license key Kc to decrypt the encrypted content data is obtained from information database 304 (step S676).

Distribution control unit 315 applies the obtained license key Kc and reproduction circuit restriction information AC2 to encryption processing unit 324. Encryption processing unit 324 encrypts license key Kc and reproduction circuit restriction information AC2 using secret common key Kcom obtained from Kcom hold unit 322 (step S678).

Encrypted data {Kc//AC2}Kcom output from encryption processing unit 324, and the transaction ID, content ID and access restriction information AC1 output from distribution control unit 315 are encrypted by encryption processing unit 326 using public encryption key KPm(1) unique to memory card 1110 obtained at step S674 (step S680).

Encryption processing unit 328 receives the output of encryption processing unit 326 to encrypt the same using session key Ks2' generated at memory card 110 (step S682).

The encrypted data {{{Kc//AC2}Kcom//transaction ID//content ID//AC1}Km(1)}Ks2' output from encryption processing unit 328 is transmitted to cellular phone 100 via data bus BS1 and communication device 350 (step S684).

Cellular phone 100 receives the transmitted encrypted data {{{Kc//AC2}Kcom//transaction ID//content ID//AC1}Km(1)}Ks2' (step S686).

Figure 24:
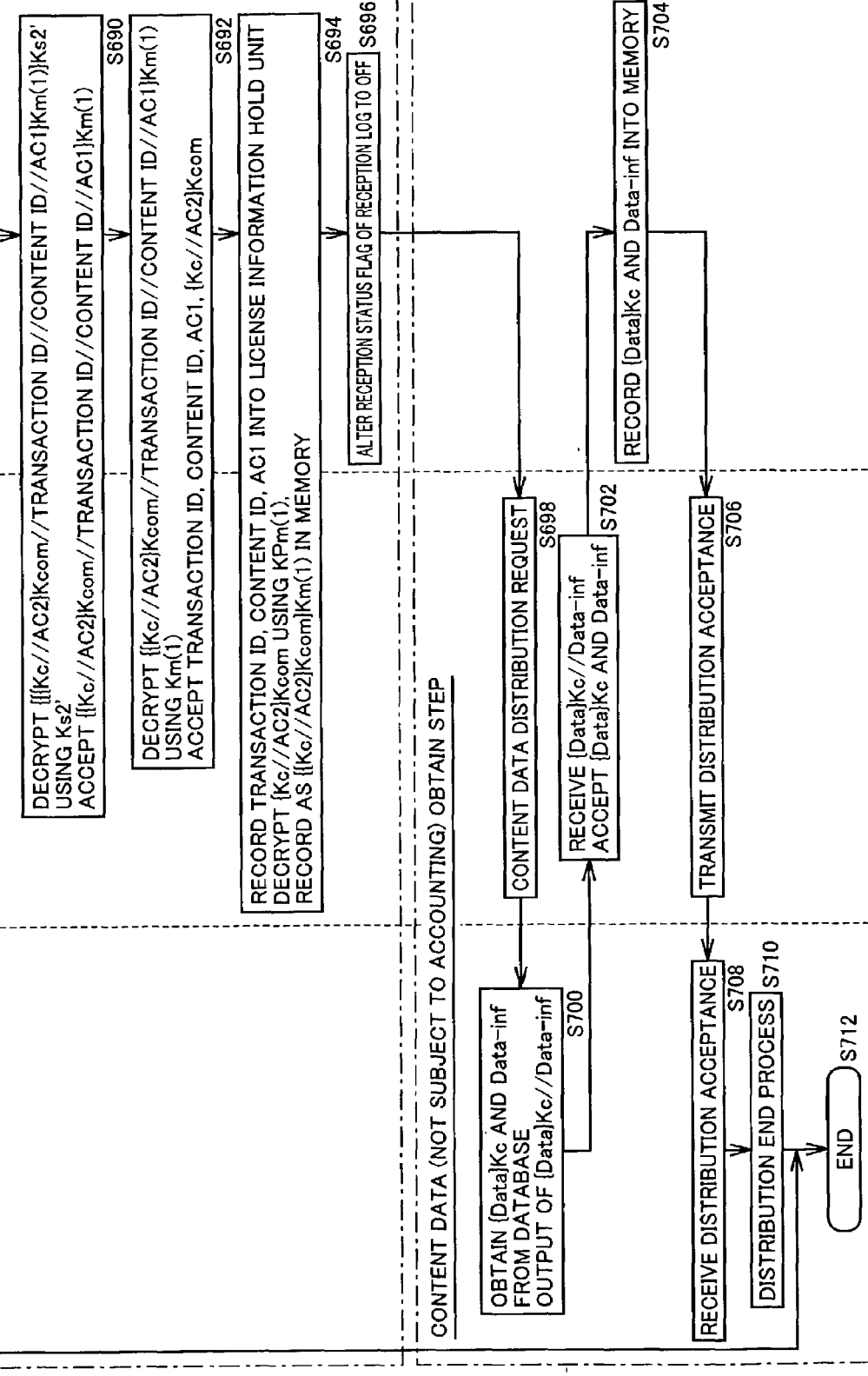
FIG. 24 is a fourth flow chart to describe a second reconnection operation of the data distribution system according to the third embodiment of the present invention.

Referring to FIG. 24, memory card 110 has the reception data applied onto data bus BS3 via memory interface 1200 decrypted by decryption processing unit 1412. Decryption processing unit 1412 uses session key Ks2' applied from session key generation unit 1418 to decrypt the reception data on data bus BS3. The decrypted data is output onto data bus BS4 (step S690).

At this stage, data {{Kc//AC2}Kcom//license ID//content ID//AC1}Km(1) that can be decrypted with private decryption key Km(1) stored in Km(1) hold unit 1421 is output. This data {{Kc//AC2}Kcom//transaction ID//content ID//AC1}Km(1) is decrypted by public encryption key Km(1), whereby data {Kc//AC2}Kcom, the transaction ID, content ID and access restriction information AC1 are accepted (step S692).

The transaction ID, content ID, access restriction information AC1 are recorded in license information hold unit 1440. Data {Kc//AC2}Kcom is encrypted with public encryption key KPm(1), and stored in memory 1415 as data {{Kc//AC2}Kcom}Km(1) (step S694).

Then, the reception status flag in the reception log in log memory 1460 is altered to the off state indicating that reception has ended (step S696).

At the stage of proper completion of the process up to step S372, a content data distribution request is issued from cellular phone 100 to distribution server 30 (step S698).

In response to this content data distribution request, distribution server 30 obtains encrypted content data {Data}Kc and additional information Data-inf from information database 304. These data are output via data bus BS1 and communication device 350 (step S700).

Cellular phone 100 receives {Data}Kc//Data-inf, and accepts encrypted content data {Data}Kc and additional information Data-inf (step S702). Encrypted content data {Data}Kc and additional information Data-inf are transmitted onto data bus BS3 of memory card 110 via memory interface 1200 and terminal 1202. At memory card 110, the received encrypted content data {Data}Kc and additional information Data-inf are directly stored in memory 1415 (step S704).

A distribution acceptance notification is transmitted from memory card 110 to distribution server 30 (step S706). When the distribution acceptance is received at distribution server 30 (step S708), the distribution end process is executed (step S710). The process of the distribution server ends (step S712).

The above description is based on a structure in which all the status information is encrypted using session key Ks1 at step S654, and encrypted data {status information//Ks2'}Ks1 is transmitted to distribution server 30 at steps S622 and S624.

The transaction ID in the status information is required only to identify its source so that its security is not so important. Since the source becomes apparent by encrypted signature data {hash}Ks1, the transaction ID does not have to be encrypted and can be transmitted to distribution server 30 in plaintext. In this case, the status information will be transmitted as transaction ID//{status information excluding transaction ID//Ks2'}Ks1, and signature data hash will be generated correspondingly.

By such a structure, reconnection can be established even when the communication line has been cut off in the processing step. Thus, the reliability of the system is further improved.

The data distribution system of the first to third embodiments was described in which encryption and decryption are carried out using secret common key Kcom at distribution server 30 and cellular phone 100. A structure implementing encryption and decryption without this secret common key Kcom is allowed.

Figure 3:
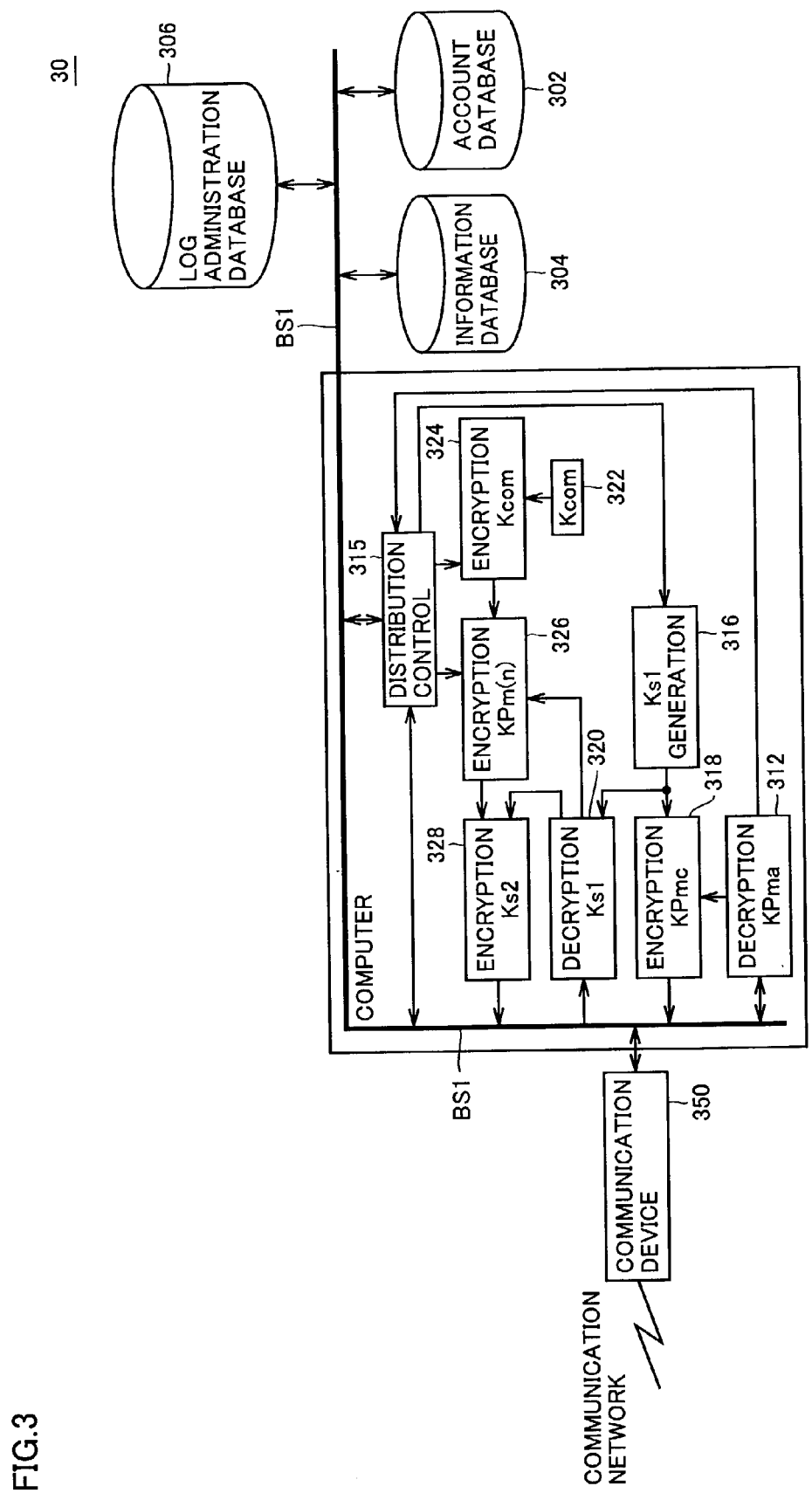
FIG. 3 is a schematic block diagram showing a structure of a license server 10.

In other words, a structure can be implemented in which distribution server 30 corresponding to the data distribution system of the first embodiment described with reference to FIG. 3 is absent of Kcom hold unit 322 and encryption processing unit 324. More specifically, license key Kc and reproduction circuit restriction information AC2 output from distribution control unit 315 can be directly transmitted to encryption processing unit 326 in distribution server 30.

Furthermore in comparison to the structure of cellular phone 100 described with reference to FIG. 4 in the first embodiment, a structure can be implemented absent of Kcom hold unit 1512 storing a secret common key Kcom and a decryption processing unit 1514 using secret common key Kcom.

In cellular phone 101 of such a structure, license key Kc is directly obtained by decryption processing unit 1510 that executes a decryption process using session key Ks4 in view that an encryption process is not performed with a secret symmetric key as a symmetric encryption key in distribution server 30. Therefore, license key Kc is directly applied to decryption processing unit 1510.

In a structure where encryption and decryption is not effected using secret common key Kcom, memory card 110 can be used intact.

In a distribution process of such a case, content key Kc and reproduction circuit restriction information AC2 are transmitted and stored without being encrypted with secret common key Kcom. The encryption process and corresponding decryption process by secret common key Kcom are no longer required. The remaining elements are similar to those of the operation of the first to third embodiments.

By such a structure, a data distribution system that enjoys advantages similar to those of the data distribution system of the first to third embodiments can be developed with a structure that does not effect an encryption process associated with secret common key Kcom.

The above-described first to third embodiments may be subject to modifications set forth below.

The first to third embodiments had data {Kc//AC2}Kcom (or data Kc//AC2 in the structure without key Kcom as mentioned above) encrypted by public encryption key KPm(1), and recorded in license information storage unit 1440. However, the second encryption using public encryption key KPm(1) is not necessary if stored in license information hold unit 1440 provided in the TRM. Advantages similar to those of the first to third embodiments can be provided even if the entire reproduction information is stored in license information hold unit 1440. In this case, step S148 of FIG. 8 and step S370 of FIG. 12 in the first embodiment are to be modified to "record the transaction ID, content ID, AC1, {Kc//AC2}Kcom in the license information hold unit". Also, step S148 of FIG. 17 and step S370 of FIG. 20 in the second embodiment and step S694 of FIG. 24 in the third embodiment are to be modified similarly to "record the transaction ID, content ID, AC1, {Kc//AC2}Kcom in the license information hold unit." If a structure without key Kcom is to be implemented corresponding to modifications of first to third embodiments, the process is to be modified to "record the transaction ID, content ID, AC1, Kc//AC2 in the license information hold unit." The data distribution system of the first to third embodiments to receive reproduction information distribution from the distribution server are described so that authentication data {KPm(1)}KPma and {KPp(1)}KPma of the memory card and cellular phone (content reproduction circuit) are transmitted to the distribution server (step S104), and received at the distribution server (step S106), decrypted using authentication key KPma (step S108), and then conducting an authentication process with respect to both the memory card and cellular phone (content reproduction circuit) according to the decryption result. However, based on the fact that i) the content reproduction circuit to reproduce music does not necessarily have to be the cellular phone receiving distribution since the memory card is detachable, and ii) in reproduction, an authentication process of authentication data {KPm(1)}KPma of the content reproduction circuit of the output destination is carried out in providing a portion of the reproduction information (license key Kc and reproduction circuit restriction information AC) from the memory card so that the security will not be degraded even if an authentication process of authentication data {KPm(1)}KPma of the content reproduction circuit in the distribution server does not have to be carried out, a structure can be implemented in which the authentication process by authentication data {KPm(1)}KPma of the content reproduction circuit of the distribution server is not carried out.

In this case, the cellular phone transmits the content ID, memory card authentication data {KPm(1)}KPma and license purchase condition data AC at step S104. The distribution server transmits the content ID, memory card authentication data {KPm(1)}KPma and license purchase condition data Ac at step S106, and authentication data {KPm(1)}KPma is decrypted using authentication key KPma to accept public encryption key KPm(1) at step S108. Then, at step S10, an authentication process to determine whether public encryption key KPm(1) has been output from a proper apparatus is conducted by authentication of the authentication server based on the decrypted result. The subsequent process is to be carried out according to the authentication result based on authentication data {KPm(1)}KPma of the memory card. There is no change in the reproduction process.

In the above description, storage of the distribution information is effected by a memory card. However, the present invention is not limited to such a case. More specifically, the present invention is applicable to a more general recording apparatus as long as the function of recording and encryption or the like similar to that of a memory card as described above is possessed. Here, the recording apparatus is not limited to a structure such as a memory card that is detachable from a communication device such as the cellular phone, and may be incorporated into a communication device.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A data recording apparatus (110) to receive and record reproduction information associated with reproduction of encrypted content data, including a content key to decrypt said encrypted content data into plaintext, through a communication path, said data recording apparatus comprising:
   a data communication unit to establish a communication path with a transmission source of said reproduction information to receive said reproduction information transmitted in an encrypted state,
   a first storage unit (1415, 1440) to store data associated with said reproduction information applied from said data communication unit,
   an information extraction unit performing a process of storing data associated with said reproduction information from said data communication unit into said first storage unit, and extracting said reproduction information based on data stored in said first storage unit,
   a second storage unit (1460) receiving said reproduction information to record reception log information indicating a processing status of a reception process to record in said first storage unit, and
   a control unit (1420) to control operation of said data recording apparatus, wherein said control unit transmits through said data communication unit said reception log information recorded in said second storage unit according to a request.

2. The data recording apparatus according to claim 1, wherein said data commun
   a first key hold unit (1402) storing a first private decryption key to decrypt data encrypted by a first public encryption key predefined corresponding to said data recording apparatus,
   a first decryption processing unit (1404) to apply a decryption process, receiving a first symmetric key updated and transmitted for each communication of said reproduction information, and encrypted with said first public encryption key,
   a second key hold unit (1416) to store a second public encryption key unique to each said data recording apparatus,
   a key generation unit (1418) generating a second symmetric key updated for each communication of said reproduction information,
   a first encryption processing unit (1406) encrypting said second public encryption key and said second symmetric key based on said first symmetric key for output, and
   a second decryption processing unit (1412) receiving said reproduction information encrypted with said second public encryption key and further encrypted with said second symmetric key to decrypt said reproduction information based on said second symmetric key,
   wherein said information extraction unit comprises
   a third key hold unit (1421) storing a second private decryption key to decrypt data encrypted with said second public encryption key, and
   a third decryption processing unit (1422) carrying out a decryption process for said second private decryption key in a procedure of a process of storing data associated with said reproduction information into said first storage unit to a process of extracting said reproduction information,
   wherein said first storage unit stores said reproduction information based on an output of said second decryption processing unit or an output of said second decryption processing unit.

3. The data recording apparatus according to claim 2, wherein said first storage unit comprises
   a third storage unit (1440) to store first data which is a portion of said reproduction information excluding said content key in a plaintext state, and
   a fourth storage unit (1415) to store in an encrypted state a portion of said reproduction information including all second data excluding said first data of said reproduction information or all of said reproduction information,
   wherein said information extraction unit stores in said third storage unit said second data from a result of a decryption process on an output of said second decryption processing unit by said third decryption processing unit, and
   comprises a re-encryption processing unit encrypting a portion of said result of a decryption process on the output of said second decryption processing unit by said third decryption processing unit using said second public encryption key to generate said first data to be stored in said fourth storage unit.

4. The data recording apparatus according to claim 3, wherein said third storage unit receives and stores said encrypted content data that can be decrypted based on said content key.

5. The data recording apparatus according to claim 2, wherein said information extraction unit stores in said first storage unit in a plaintext state a result of a decryption process on an output of said second decryption processing unit by said third decryption processing unit.

6. The data recording apparatus according to claim 5, wherein said first storage unit comprises
   a third storage unit (1415) to receive and store said encrypted content data that can be decrypted based on said content key, and
   a fourth storage unit (1440) to store said reproduction information in plaintext state.

7. The data recording apparatus according to claim 2, wherein said reception log information includes communication identify information to identify said reception process generated at said communication source at every reception process of said reproduction information, and said second symmetric key.

8. The data recording apparatus according to claim 7, wherein said reception log information further includes status information indicating that said reproduction information is already recorded in said first storage unit in said reception process.

9. The data recording apparatus according to claim 1, wherein said reception log information is erased from said second storage unit every time said reproduction information is recorded in said first eighth storage unit in said reception process.

10. The data recording apparatus according to claim 9, wherein said status information is flag information rendered on every time transmission of said reproduction information is requested to said transmission source in said reception process, and rendered off every time said reproduction information is recorded in said first storage unit.

11. The data recording apparatus according to claim 2, further comprising a fifth storage unit (1400) storing authentication data to conduct an authentication process at a transmission source of said reproduction information, prior to reception of said reproduction information.

12. The data recording apparatus according to claim 1, wherein said authentication data includes a first public encryption key.

13. The data recording apparatus according to claim 11, further comprising means for generating signature information based on all or a portion of said reception log information,
wherein said signature information corresponding to said reception log information is generated and output together with said reception log information in providing said reception log information.

14. The data recording apparatus according to claim 12, wherein said first encryption processing unit encrypts said reception log information and said signature information respectively based on said first symmetric key, and
said data recording apparatus transmitting to said transmission source said reception log information and said signature information encrypted individually at said first encryption processing unit.

15. The data recording apparatus according to claim 12, said data recording apparatus being a memory card, and
wherein said first storage unit is a nonvolatile semiconductor memory.

16. A data distribution system comprising a data supply apparatus to supply encrypted content data and reproduction information associated with reproduction of encrypted content data, including a content key which is a decryption key to decrypt said encrypted content data into plaintext, wherein said data supply apparatus (10) comprises
distribution information hold unit (304) to store said content data and said reproduction information,
a first interface unit (350) to transfer data with an external source,
a first session key generation unit (316) generating a first symmetric key updated for each distribution of said reproduction information to said terminal,
a session key encryption unit (318) encrypting said first symmetric key using a first public encryption key predefined corresponding to a terminal of said user, and applying the encrypted key to said first interface unit,
a session key decryption unit (320) to decrypt the second public encryption key and second symmetric key transmitted in an encrypted state by said first symmetric key,
a first license data encryption processing unit (326) to encrypt reproduction information to reproduce said encrypted content data using said second public encryption key decrypted by said session key decryption unit,
a second license data encryption processing unit (328) encrypting an output of said first license data encryption processing unit with said second symmetric key, and applying the encrypted output to said first interface unit for distribution, and
a distribution log information hold unit (306) to record distribution log information indicating a processing status during said distribution process,
a second decryption processing unit (1412) receiving reproduction information encrypted with said second public encryption key and further encrypted with said second symmetric key to decrypt said reproduction information based on said second symmetric key,
a first storage unit (1415, 1440) to store said reproduction information based on an output of said second decryption processing unit, a third key hold unit (1421) storing a second private decryption key to decrypt data encrypted with said second public encryption key,
a third decryption processing unit (1422) performing a decryption process for said second private decryption key in a procedure of a process of storing data associated with said reproduction information into said first storage unit to a process of extracting said reproduction information,
a second storage unit (1460) to record reception log information indicating a processing status in a distribution process of reproduction information, and
a reception control unit (1420) controlling data transfer with an external source,
wherein said reception control unit controls a redistribution process based on said reception log information when said communication path is cut during said distribution process.

17. The data distribution system according to claim 16, wherein said data storage unit is a memory card detachable from said terminal.

18. The data distribution system according to claim 16, wherein said data storage unit further comprises a fifth storage unit (1400) storing authentication data to conduct an authentication at a transmission source of said reproduction information, prior to reception of said reproduction information,
wherein said data supply apparatus further comprises means (312) for verifying authenticity of said memory card by authentication data stored in said data storage unit and transmitted, prior to distribution of said reproduction information,
wherein said data supply apparatus transmits said reproduction information to said terminal loaded with said data storage unit when authenticity of said data storage unit is verified in said authentication process.

19. The data distribution system according to claim 16, wherein said distribution log information includes reproduction information identify information to identify said distribution information to be distributed, a communication identify information to identify said distribution process generated at said data supply apparatus for each distribution process of said reproduction information, and said second symmetric key,
wherein said reception log information includes said communication identify information and said second symmetric key.

20. The data distribution system according to claim 16, wherein said reception log information is erased from said second storage unit every time said reproduction information is stored in said first storage unit.

21. The data distribution system according to claim 16, wherein said reception log information includes a reception status flag rendered on every time distribution of said reproduction information is requested to said data supply apparatus, and rendered off every time said reproduction information is stored in said first storage unit.

22. The data distribution system according to claim 16, wherein said reception log information includes at least said communication identify information and said second symmetric key.

23. A data supply apparatus to supply reproduction information to a plurality of terminals (100) corresponding to a plurality of users, respectively, including a data storage unit to record reproduction information associated with reproduction of encrypted content data, including a content key which is a decryption key to decrypt said encrypted content data into plaintext, and reception log information indicating a processing status of said distribution process in a distribution process receiving and recording said reproduction information, said data supply apparatus comprising:

distribution information hold unit (304) to store said content data and said reproduction information, a first interface unit (350) to transfer data with an external source, a first session key generation unit (316) generating a first symmetric key updated for each distribution of said reproduction information to said terminal, a session key encryption unit (318) encrypting said first symmetric key using a first public encryption key predefined corresponding to a terminal of said user, and applying the encrypted key to said first interface unit, a session key decryption unit (320) to decrypt the second public encryption key and second symmetric key transmitted in an encrypted state by said first symmetric key, a first license data encryption processing unit (326) to encrypt reproduction information to reproduce said encrypted content data using said second public encryption key decrypted by said session key decryption unit, a second license data encryption processing unit (328) encrypting an output of said first license data encryption processing unit with said second symmetric key, and applying the encrypted output to said first interface unit for distribution, a distribution log information hold unit (306) to record distribution log information indicating a processing status during said distribution process, and a distribution control unit, wherein said distribution control unit controls a redistribution process based on said reception log information and said distribution log information recorded in said data storage unit when said communication path is cut during said distribution process.

24. The data supply apparatus according to claim 23, wherein said data supply apparatus further comprises means (312) for verifying authenticity of said data storage unit by authentication data transmitted from said data storage unit and transmitted, prior to distribution of said reproduction information, and wherein said reproduction information is transmitted when authenticity of said data storage unit is verified in said authentication process.

25. The data supply apparatus according to claim 23, wherein said distribution log information includes reproduction information identify information to identify said distribution information to be distributed, a communication identify information to identify said distribution process generated at said data supply apparatus for each distribution process of said reproduction information, and said second symmetric key, wherein said reception log information includes said communication identify information and said second symmetric key.

* * * * *